United States Patent
Glasgow et al.

(10) Patent No.: US 7,332,889 B2
(45) Date of Patent: Feb. 19, 2008

(54) BATTERY CHARGER

(75) Inventors: Kevin L. Glasgow, Lomira, WI (US); David J. Rozwadowski, Greenfield, WI (US); Jeffrey M. Zeiler, Delafield, WI (US); George L. Santana, Jr., New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 463 days.

(21) Appl. No.: 10/289,621

(22) Filed: Nov. 7, 2002

(65) Prior Publication Data

US 2003/0090234 A1 May 15, 2003

Related U.S. Application Data

(63) Continuation-in-part of application No. 29/160,301, filed on May 7, 2002, now Pat. No. Des. 487,059.

(60) Provisional application No. 60/379,068, filed on May 9, 2002, provisional application No. 60/344,431, filed on Nov. 9, 2001.

(51) Int. Cl.
*H02J 7/00* (2006.01)
*H05K 7/20* (2006.01)

(52) U.S. Cl. ...................... 320/107; 361/690

(58) Field of Classification Search ............. 320/107, 320/113, 114, 115, 132, DIG. 19, DIG. 21; 361/600, 679, 690, 694–698, 622, 625, 676–678, 361/688, 692, 704; 429/99, 100; 454/184–186; 165/80.3, 121–122
See application file for complete search history.

(56) References Cited

U.S. PATENT DOCUMENTS

| 2,266,686 | A | 12/1941 | Emanuel |
| 3,579,075 | A | 5/1971 | Floyd |
| 4,009,429 | A | 2/1977 | Mullersman |
| 4,211,968 | A | 7/1980 | Sugalski |
| 4,229,686 | A | 10/1980 | Mullersman et al. |
| 4,237,409 | A | 12/1980 | Sugalski |
| 4,288,733 | A | 9/1981 | Bllanceri et al. |
| 4,315,364 | A | 2/1982 | Leffingwell |
| 4,612,491 | A | 9/1986 | McCarty et al. |

(Continued)

FOREIGN PATENT DOCUMENTS

CN 1250345 4/2000

(Continued)

OTHER PUBLICATIONS http://en.wikipedia.org/wiki/LED□□The construction features of an LED.*

*Primary Examiner*—Bao Q. Vu
*Assistant Examiner*—Richard V. Muralidar
(74) *Attorney, Agent, or Firm*—Michael Best & Friedrich LLP

(57) ABSTRACT

A battery charger. The battery charger includes a housing having an outer surface, a battery being supportable on the outer surface, a charging circuit supported by the housing and electrically connectable to a power source and the battery, and a protective structure connected to and extending from the outer surface of the housing, the protective structure extending from the outer surface beyond the battery.

3 Claims, 28 Drawing Sheets

U.S. PATENT DOCUMENTS

| | | | |
|---|---|---|---|
| 4,629,962 A * | 12/1986 | Arakawa | 320/113 |
| 4,639,655 A | 1/1987 | Westhaver et al. | |
| 4,641,076 A | 2/1987 | Linden | |
| 4,641,077 A | 2/1987 | Pascaloff | |
| 4,669,728 A * | 6/1987 | Carden | 463/22 |
| 4,997,731 A | 3/1991 | Machida et al. | |
| 5,028,859 A | 7/1991 | Johnson et al. | |
| 5,039,929 A | 8/1991 | Velstroffer et al. | |
| 5,144,217 A | 9/1992 | Gardner et al. | |
| 5,191,276 A | 3/1993 | Zainaleain | |
| 5,192,904 A | 3/1993 | Leiserson | |
| 5,206,576 A | 4/1993 | Jasinski | |
| 5,280,229 A | 1/1994 | Faude et al. | |
| 5,287,013 A | 2/1994 | Adair | |
| D348,461 S | 7/1994 | Peersmann | D14/189 |
| 5,391,972 A | 2/1995 | Gardner et al. | |
| 5,394,073 A | 2/1995 | Nagai | |
| 5,457,376 A | 10/1995 | Chong et al. | |
| 5,486,749 A | 1/1996 | Brainard | |
| 5,523,666 A | 6/1996 | Hoelzl et al. | |
| 5,525,888 A | 6/1996 | Toya | |
| 5,539,297 A | 7/1996 | Fiebig | |
| 5,560,077 A * | 10/1996 | Crotchett | 15/339 |
| 5,585,783 A * | 12/1996 | Hall | 340/473 |
| 5,621,301 A | 4/1997 | Allen et al. | |
| 5,640,078 A | 6/1997 | Kou et al. | |
| 5,656,914 A | 8/1997 | Nagele et al. | |
| 5,664,015 A * | 9/1997 | Ford et al. | 379/433.01 |
| 5,684,384 A | 11/1997 | Barkat et al. | |
| 5,691,618 A | 11/1997 | Kobayashi et al. | |
| 5,717,309 A | 2/1998 | Cho | |
| 5,727,372 A * | 3/1998 | Kanitz et al. | 56/11.9 |
| 5,734,253 A | 3/1998 | Brake et al. | |
| 5,747,964 A | 5/1998 | Turnbull | |
| 5,757,163 A | 5/1998 | Brotto et al. | |
| 5,780,991 A | 7/1998 | Brake et al. | |
| 5,821,733 A | 10/1998 | Turnbull | |
| 5,856,038 A | 1/1999 | Mason | |
| 5,910,380 A | 6/1999 | Taraboulos et al. | |
| D412,487 S | 8/1999 | Nagele et al. | D13/108 |
| 5,939,858 A | 8/1999 | Dodd et al. | |
| 5,959,434 A | 9/1999 | Park et al. | |
| 6,049,192 A | 4/2000 | Kfoury et al. | |
| D424,515 S | 5/2000 | Sage | D13/107 |
| 6,057,608 A * | 5/2000 | Bailey et al. | 307/43 |
| 6,066,938 A * | 5/2000 | Hyodo et al. | 320/114 |
| 6,091,611 A | 7/2000 | Lanni | |
| D429,211 S | 8/2000 | Ohi et al. | D13/107 |
| 6,104,292 A * | 8/2000 | Rombom et al. | 340/573.1 |
| 6,124,699 A | 9/2000 | Suzuki et al. | |
| 6,127,802 A | 10/2000 | Lloyd et al. | |
| 6,218,807 B1 * | 4/2001 | Sakaue et al. | 320/107 |
| 6,246,211 B1 * | 6/2001 | Dalton et al. | 320/114 |
| 6,308,059 B1 | 10/2001 | Domes | |
| 6,346,793 B1 * | 2/2002 | Shibata et al. | 320/113 |
| 6,362,594 B2 * | 3/2002 | Kajiura | 320/104 |
| 6,427,070 B1 * | 7/2002 | Smith | 455/343.6 |
| 6,456,837 B1 | 9/2002 | Domes | |
| 6,475,680 B1 * | 11/2002 | Arai et al. | 429/340 |
| 6,509,715 B1 * | 1/2003 | LaRue | 320/107 |
| 6,512,177 B2 * | 1/2003 | Kosuge | 174/66 |
| D474,175 S | 5/2003 | Furusho et al. | D14/217 |
| D474,176 S | 5/2003 | Furusho et al. | D14/217 |
| D474,177 S | 5/2003 | Furusho et al. | D14/217 |
| D479,223 S | 9/2003 | Furusho et al. | D14/196 |
| 6,730,004 B2 * | 5/2004 | Selsam | 482/93 |
| 2001/0003416 A1 | 6/2001 | Kajiura | |
| 2002/0077073 A1 * | 6/2002 | Smith | 455/343 |
| 2002/0117996 A1 * | 8/2002 | Cheng | 320/114 |
| 2003/0031979 A1 * | 2/2003 | Shortt et al. | 433/118 |
| 2003/0068545 A1 * | 4/2003 | Wu | 429/98 |

FOREIGN PATENT DOCUMENTS

| | | |
|---|---|---|
| EP | 0572327 | 1/2002 |
| GB | 2106728 | 1/2002 |

* cited by examiner

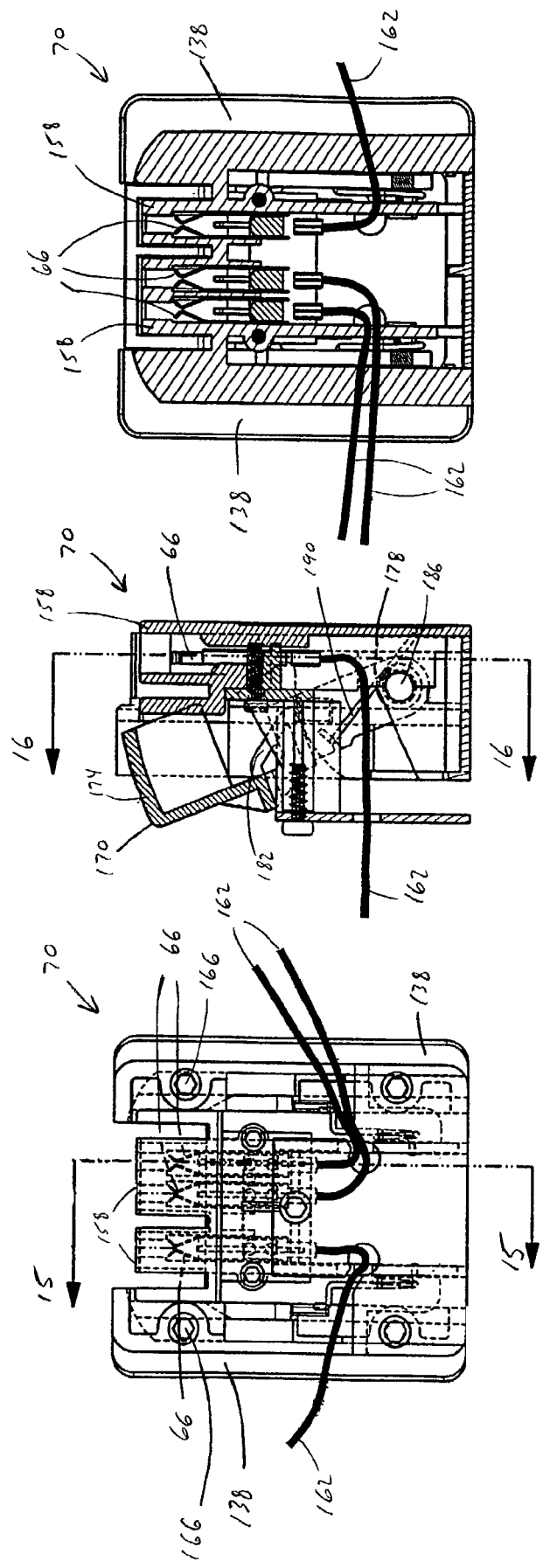

BATTERY CHARGER

RELATED APPLICATIONS

The present application claims the benefit of co-pending Provisional Application Ser. No. 60/379,068, filed May 9, 2002, and co-pending Provisional Patent Application Ser. No. 60/344,431, filed Nov. 9, 2001, and is a continuation-in-part of co-pending Design patent application Ser. No. 29/160,301, filed May 7, 2002 now U.S. Pat. No. D487,059.

BACKGROUND OF THE INVENTION

Typically, a battery charger includes a charger housing and a charging circuit supported by the charger housing that is electrically connectable to a power source. A battery is supported by the charger housing and electrically connected to the charging circuit so that power is selectively supplied to the battery to charge the battery. The battery is connected to the charging circuit by charger terminals supported on the charger housing.

SUMMARY OF THE INVENTION

Existing battery chargers and their individual components are not suited for heavy-duty use commonly found at a work site including impacts from falling objects or from the battery charger falling. Also, existing battery chargers and their individual components are not suited for outdoor use including being exposed to weather (i.e. sun, rain, wind, etc.) and other contaminants (i.e. dirt, sand, gravel, mud, sawdust, etc.). Weather and contaminants can damage the components of the battery charger and may render the battery charger inoperable.

In existing battery chargers, the charging terminals are typically exposed to the outside environment. Contaminants (such as dirt, sand, mud, sawdust, etc.) may block the charger terminals and prevent electrical connection between the charger terminals and the battery (and charging circuit) or cause a short circuit of the charging circuit. Also, with existing battery chargers, the charge status indicators are not easily seen in outdoor sunlight.

Existing battery chargers may employ an inefficient charging routine when charging batteries. Some battery chargers maintain charging even after the battery has reached full charge. Such a routine leads to unnecessary heating of the battery, therefore, decreasing the cycle life of the battery. Other battery chargers terminate charging when a pre-set time limit is reached. This routine can also result in overheating and a decrease in battery cycle life or may result in a battery not being fully charged when the charging routine has terminated. Existing multiple-port battery chargers include a single charging circuit for all the multiple ports and for all the batteries being charged such that a failure of any component of the charging circuit renders all of the charging ports inoperable.

The present invention provides a battery charger which substantially alleviates one or more of the above-described and other problems with existing battery chargers. In some aspects, the battery charger is a multiple-port battery charger for charging power tool batteries. In some aspects, the battery charger is a heavy-duty battery charger designed to be used outdoors and/or in harsh working conditions.

More particularly, in some aspects, the invention provides a battery charger including a housing having an outer surface, a battery being supportable on the outer surface, a charging circuit supported by the housing and electrically connectable to a power source and to the battery, and protective structure connected to and extending from the outer surface of the housing, the protective structure extending from the outer surface beyond the battery.

Also, in some aspects, the invention provides a battery charger including a housing having an outer surface, a battery being supportable on the outer surface, a charging circuit supported by the housing and electrically connectable to a power source and to the battery, a base connected to the housing for supporting the battery charger on a surface, the base extending beyond the outer surface of the housing and beyond the battery, and a bar connected to the housing at a first end of the housing, the bar extending beyond the outer surface of the housing and beyond the battery.

In addition, in some aspects, the invention provides a battery charger including a housing, a charging circuit supported by the housing and electrically connectable to a power source and to a battery, a vent defined by the housing, the vent releasing heated air from the housing and impeding entry of contaminants into the housing, the vent causing the heated air to turn downwardly turn through the vent before being released from the housing, and a drain defined by the housing, the drain releasing contaminants from the housing.

Further, in some aspects, the invention provides a battery charger including a housing, a charging circuit supported by the housing and electrically connectable with a power source, and a battery port connected to the housing and operable to support a battery. The battery port includes a charger terminal electrically connectable to the charging circuit to electrically connect the battery to the charging circuit, a charger terminal support defining an opening, the terminal being supported in the opening, and a charger terminal cover supported by the battery port, the terminal cover closing the opening when the battery is not supported by the battery port.

In addition, in some aspects, the invention provides a battery charger including a housing, a charging circuit supported by the housing and electrically connectable to a power source and a battery, an LED positioned at least partially outside of the housing and electrically connected to the charging circuit, the LED being operable to display a charge status of the battery, and a translucent cover connected to the housing and at least partially enclosing the LED.

Also, in some aspects, the invention provides a battery charger including a charging routine having a temperature rate termination technique. This charging routine is designed to function with, for example, Nickel-Metal Hydride (NiMH), Nickel-Cadmium (NiCd), Lithium-ion (Li-ion) etc. battery cells and includes a maintenance routine and boost routine that follows the normal charge execution.

In addition, in some aspects, the invention provides a multiple-port battery charger including a separate and dedicated charging circuit for each charging port. This configuration allows the remaining charging circuits to be operable if one charging circuit should fail.

In some aspects of the invention, the heavy-duty construction of the battery charger allows the battery charger and its components to withstand impacts after falling several feet or being impacted by other objects, in addition to protecting an attached battery from jarring loose as a result of the impact.

In some aspects of the invention, the contaminant-resistant air vents prevent any liquid or solid contaminants from entering the charger housing. Also, a series of drains are incorporated within the charger to purge any contaminant that may enter the housing, and the suspended charging circuits are kept out of contact from such contaminants.

In some aspects of the invention, the terminal cover prevents any contaminants from contacting the charger terminals when a battery is not connected with the battery charger. The cover also provides a sweeping action to keep clean the interconnection between the charging terminals and the battery.

In some aspects of the invention, the LED charge status indicators are bright enough to see in the outdoor sunlight and are viewable from a long distance about a wide range of viewing angles.

In some aspects of the invention, the temperature rate termination technique of the charging routine reduces charge time by several minutes, reduces heat due to charging, and/or increases the cycle life of the battery.

In some aspects of the invention, the independent charging circuits provide the user increased reliability such that a failure of one charging circuit does not result in a complete failure of the multiple port battery charger.

Independent features and independent advantages of the present invention will become apparent to those skilled in the art upon review of the following detailed description, claims and drawings.

BRIEF DESCRIPTION OF THE DRAWINGS

FIG. 14 illustrates a battery port as viewed from the inside of the front housing.

FIG. 15 is a cross-sectional view of the battery port taken generally along line 15-15 in FIG. 14.

FIG. 16 is a cross-sectional view of the battery port taken generally along line 16-16 in FIG. 15 and showing the charging terminals and their respective electrical leads extending away from the terminals.

Figure 1:
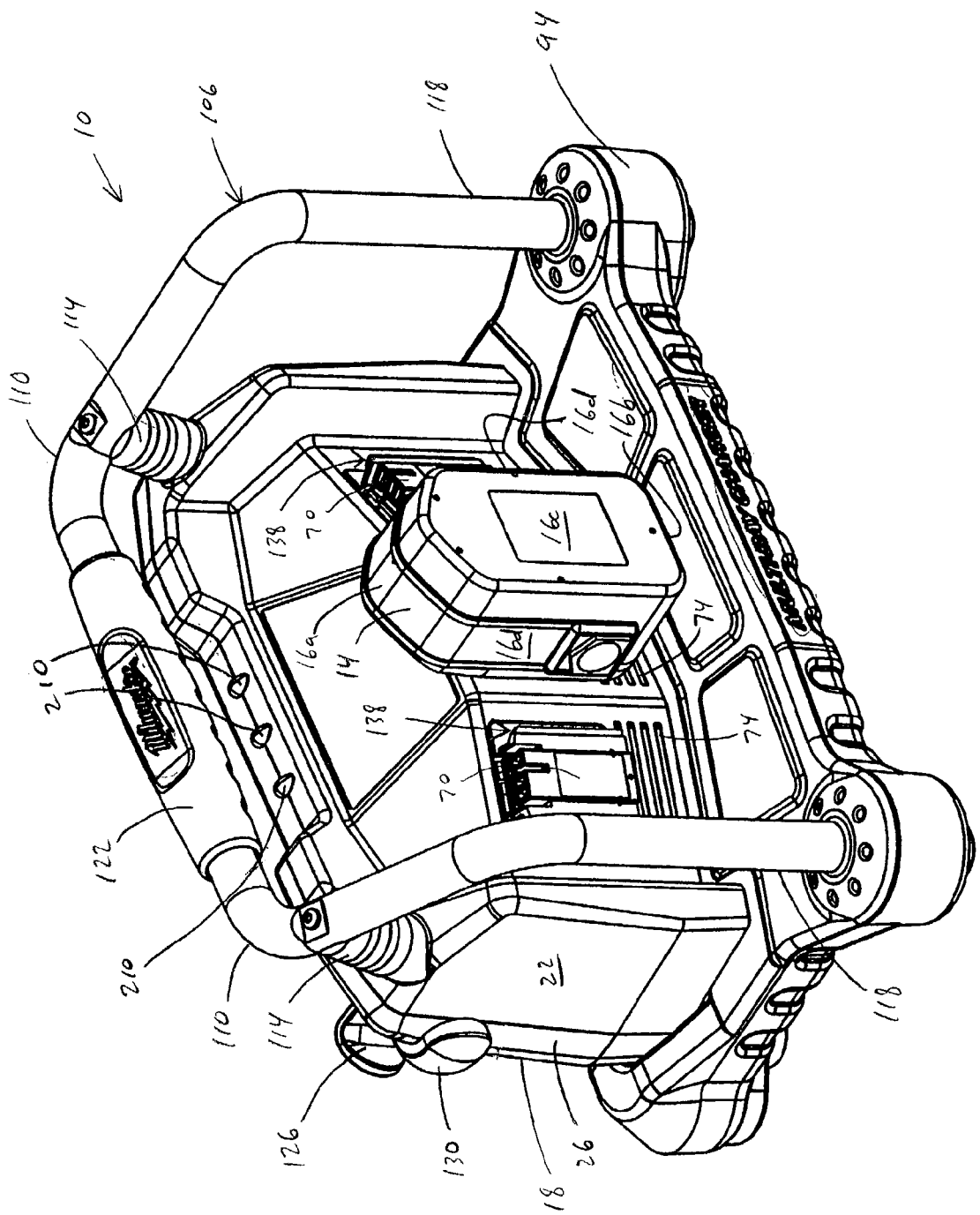
FIG. 1 is a front perspective view of a battery charger embodying the present invention.
Figure 2:
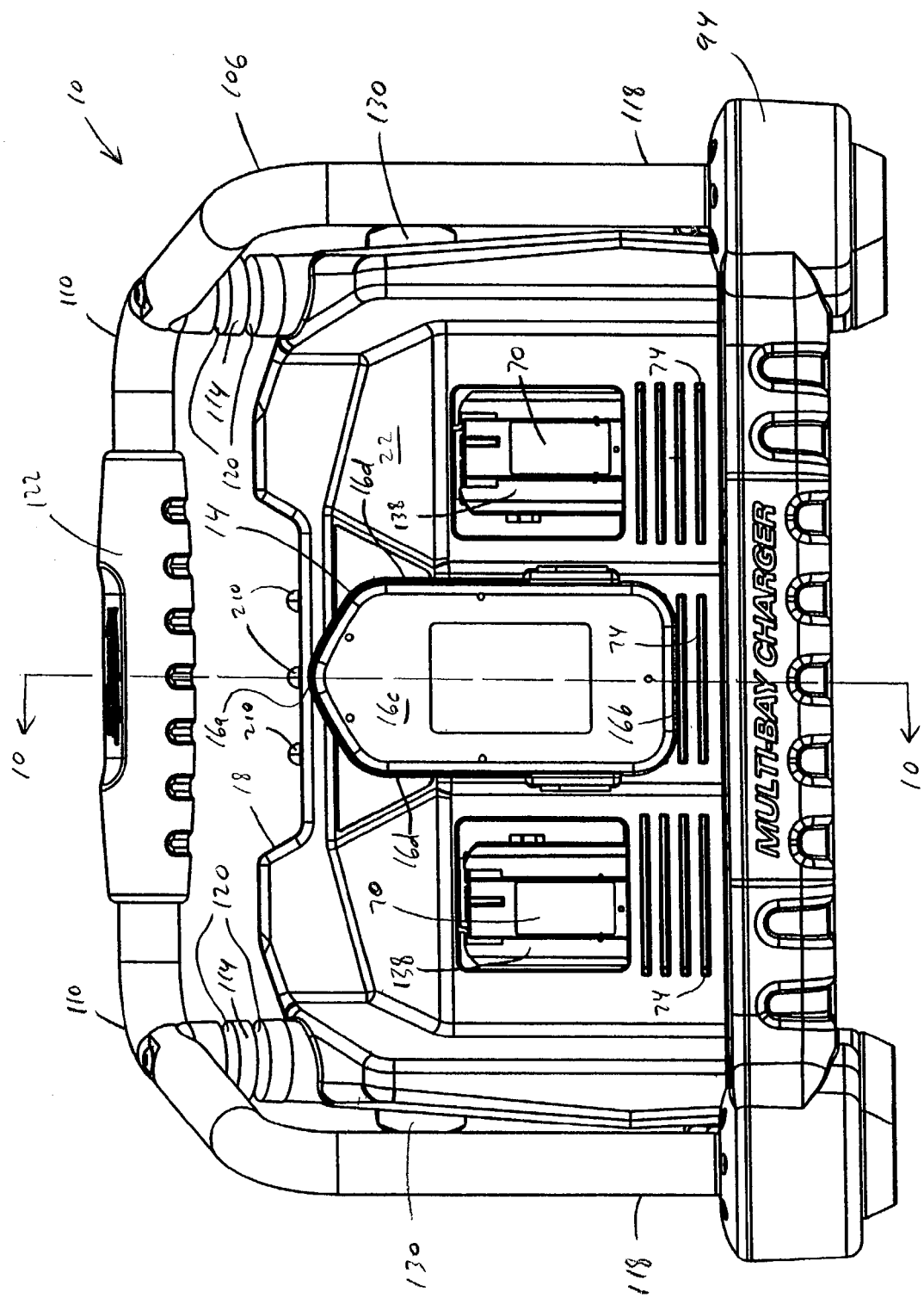
FIG. 2 is a front view of the battery charger shown in FIG. 1.
Figure 3:
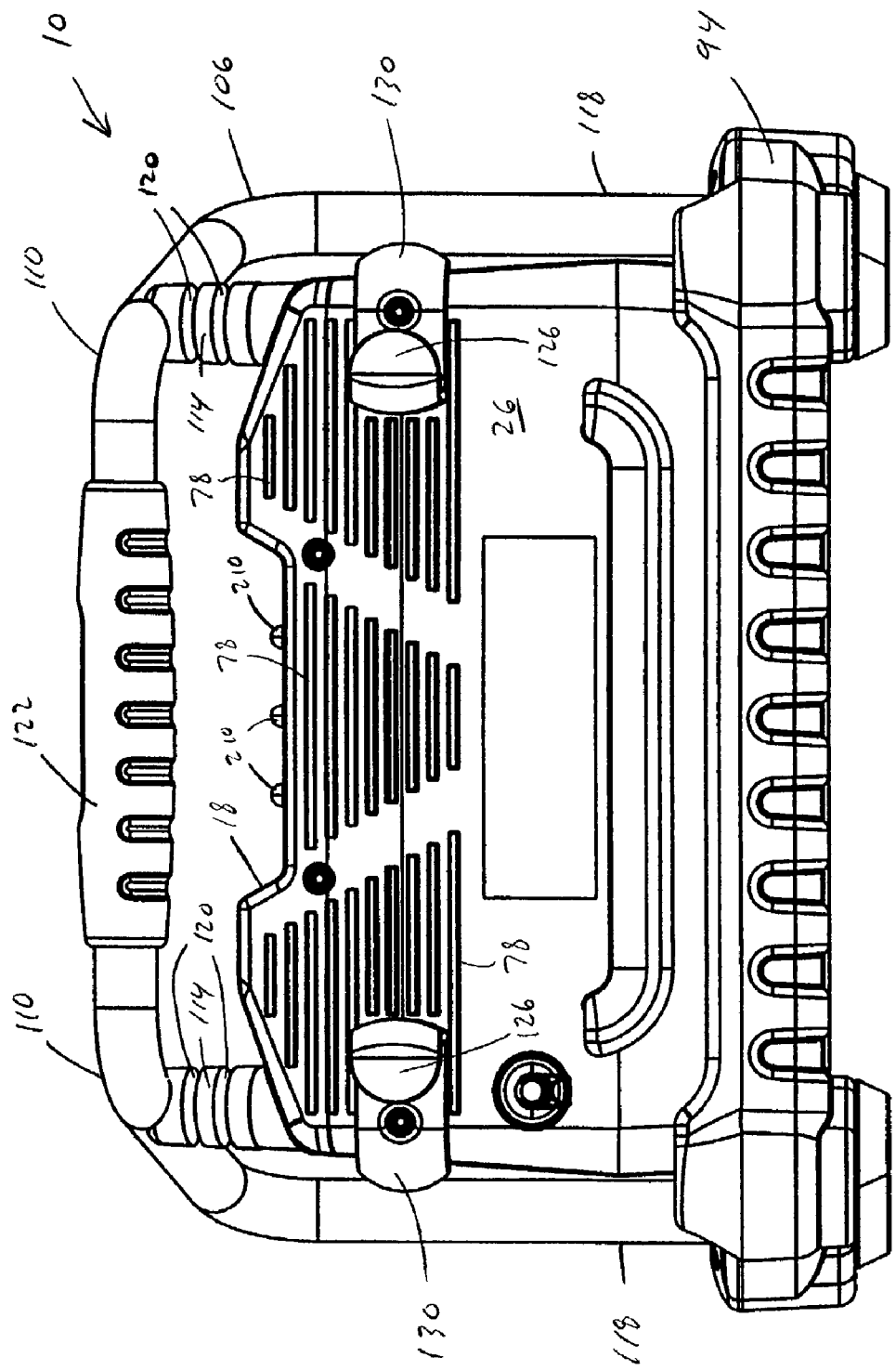
FIG. 3 is a rear view of the battery charger shown in FIG. 1.

Before an embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENTS

A battery charger 10 embodying aspects of the invention is illustrated in FIGS. 1-11. In general, in some aspects, the battery charger 10 is constructed for heavy-duty use in a harsh working environment (for electrical equipment) such as outdoor construction sites, machine shops, manufacturing floors, etc. The charger 10 is operable to support and charge batteries 14, such as, for example, 12V, 14.4V, 18V or similar power tool or other equipment batteries 14 of various chemistries (NiCd, NiMH, Li-ion, etc.). Generally, the batteries 14 include a top surface 16a, a bottom surface 16b, a front surface 16c and two side surfaces 16d to define a generally rectangular shape. However, the batteries 14 may define any number of shapes.

Figure 10:
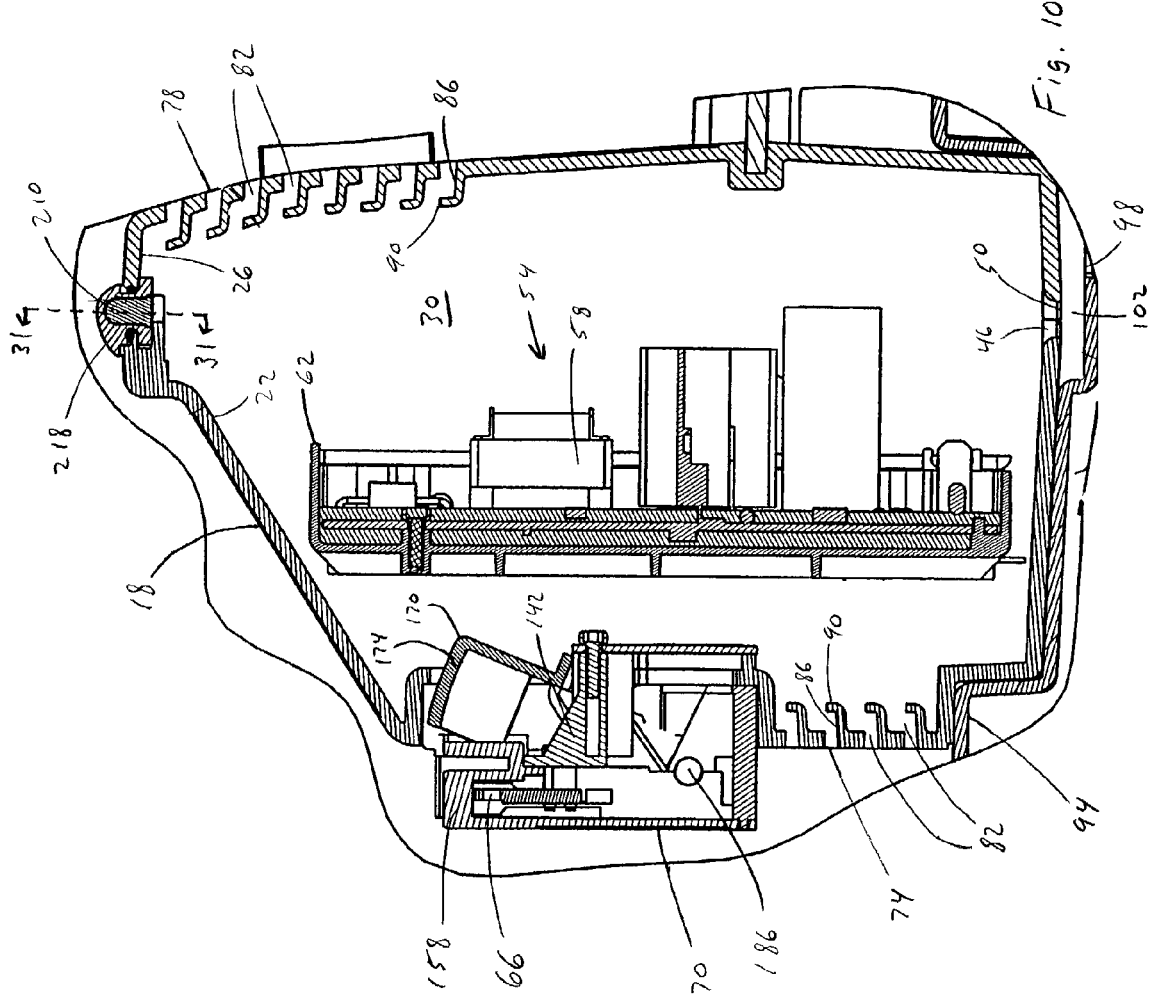
FIG. 10 is a partial cross-sectional view of the battery charger taken generally along line 10-10 in FIG. 2 with the battery removed.
Figure 11:
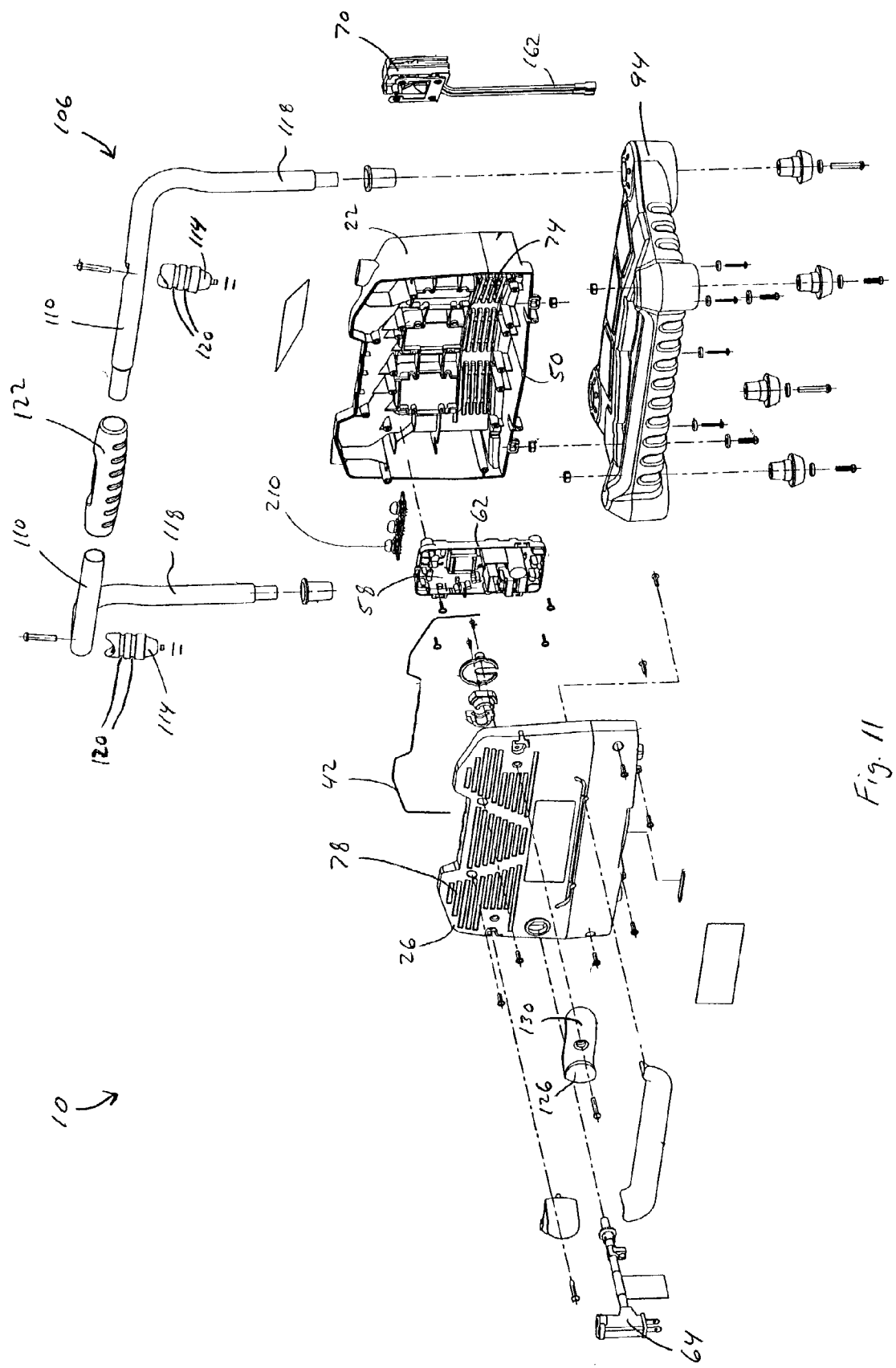
FIG. 11 is an exploded view of the battery charger shown in FIG. 1.

As shown in FIGS. 10-11, the charger 10 includes a housing 18 manufactured of a plastic material as a two-piece design. A first shell 22 is connected to a second shell 26 to form a cavity 30 therebetween. A tongue 34 and a groove 38 are utilized to mate the two shells 22, 26, and an o-ring 42 is positioned between the two shells 22, 26 to seal the interface between the two shells 22, 26. The two shells 22, 26 are also molded to define a low spot 46 at the bottom of the housing 18 when the shells 22, 26 are mated. A drain 50 is positioned in the low spot 46 to release any contaminant (i.e. dirt, sand, gravel, sawdust, metal shavings, water, oil, grease, etc.) that may enter the cavity 30.

Figure 12:
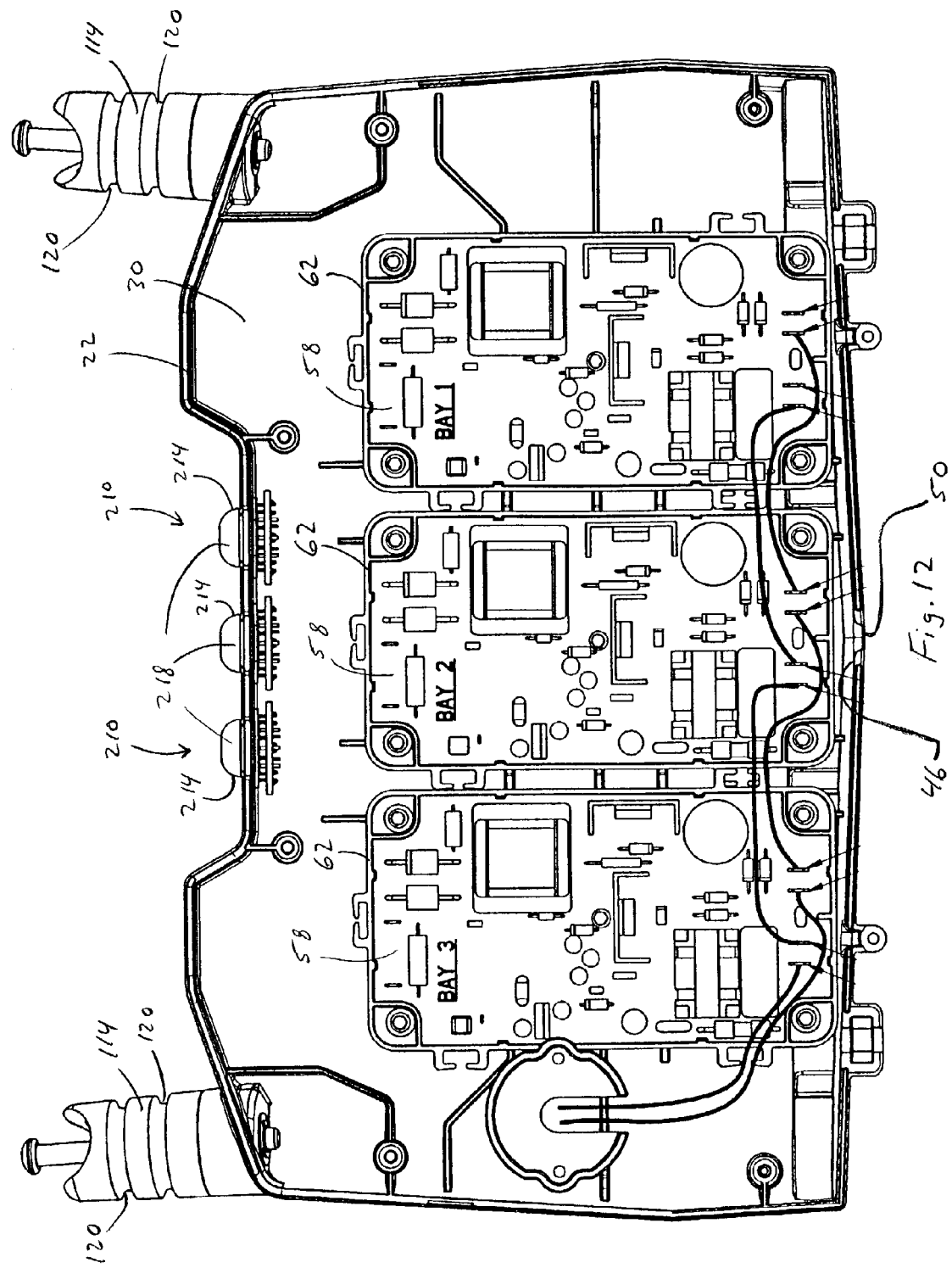
FIG. 12 is a rear view of an interior portion of the front shell of the housing and showing the charging circuits.

As shown in FIGS. 10-12, charging circuits 58 are supported by suspended and cushioned mounting boards 62 housed within the cavity 30. The mounting boards 62 are made of a flame-retardant material, such as a VØ-rated plastic. The charging circuits 58 and the mounting boards 62 are formed as an assembly, and the charging circuits 58 are potted in the flame retardant material to seal and insulate the components of the charging circuits 58. The components of the charging circuits 58 are supported on the mounting boards 62 with required spacing, sealing and insulation to meet UL requirements.

The cushioned mounting configuration of the mounting boards 62 protects the charging circuits 58 during an impact. Such cushioning may be provided by any elastically deformable material (not shown), such as, for example, rubber washers, positioned between the board 62 and housing 18.

This mounting configuration also helps minimize exposure of the charging circuits 58 to any contaminant (e.g. dirt, sand, gravel, sawdust, metal shavings, water, oil, grease, etc.) that may enter the cavity 30. Any contaminant entering the cavity 30 will come to rest along an interior wall or adjacent walls of the housing 18, depending on the orientation of the housing 18. Therefore, with the charging circuits 58 suspended in the middle of the housing 18, it is unlikely any contaminants will contact or come to rest on the charging circuits 58.

The charging circuits 58 are connectable to a power source (not shown), such as an AC power source through a power cord 64, or a DC power source. Charger terminals 66 on battery ports 70 connect the battery 14 to the charging circuit 58.

As shown in FIG. 12, the charger 10 utilizes a separate and dedicated charging circuit 58 for each battery port 70. With this configuration, if one charging circuit 58 fails, the remaining charging circuits 58 will be operable, and the charger 10 will not be rendered totally inoperable. Each charging circuit 58 may be similar to the charging circuit described in U.S. Pat. No. 6,222,343, issued Apr. 24, 2001, and U.S. patent application Ser. No. 09/672,620, filed Sep. 29, 2000, now U.S. Pat. No. 6,456,035, issued Sep. 24, 2002, which are hereby incorporated by reference.

As shown in FIGS. 10-11, air vents 74 are defined in the lower part of the first shell 22, and air vents 78 are defined in the upper part of the second shell 26. The air vents 74, 78 include ascending and stepped passageways 82 into the cavity 30. Structure defining each passageway 82 includes an outer lip 84, a spacer portion 86, which may have a substantially flat surface, and an inner lip 90 toward the end of the portion 86. This structure helps to prevent any solid (i.e. dirt, sand, sawdust, metal shavings, etc.) or liquid (i.e. water, oil, grease, etc.) contaminants from entering the cavity 30. The outer lip 84 will deflect contaminants. To enter the cavity 30, the structure of the air vents 74, 78 requires any contaminant to first penetrate the exterior of the housing 18, move along the substantially flat surface of the portion 86, and then ascend past the level defined by the inner lip 90. This tortuous path prevents unforced entry of any solid or liquid contaminants into the housing 18. However, if contaminants were to enter the cavity 30, such contaminants would be released through the drain 50.

Generally, during operation of the charger 10, heat is generated by the charging circuits 58. Through unforced convection, cooling air is drawn through the air vents 74 into the cavity 30 and flows across the heated charging circuits 58. The cooling air is heated by the charging circuits 58, causing the heated air to rise and escape the cavity 30 through the air vents 78.

In other constructions (not shown), the charger 10 may utilize electrically operated fans to cool the heated charging circuits 58 rather than unforced convection through air vents 74, 78. Also, heat removal elements (not shown) such as, for example, heat sinks, heat pipes, etc. may be incorporated into the battery charger 10 to draw heat from the charging circuits 58.

As shown in FIG. 11, the housing 18 is mounted to a base 94 which is designed to buffer and cushion the housing 18 along the edges of the base 94. In the illustrated construction, the base 94 is blow molded from a high density polyethylene (HDPE) which is a very strong and impact-resistant material. This material selection allows the base 94 to more effectively absorb the energy associated with an impact. In the illustrated construction, uniform wall thickness of about 0.100" around the base 94 prevents its collapse (especially near the corners) when the base 94 is impacted after a fall or some other impacting event.

Figure 8:
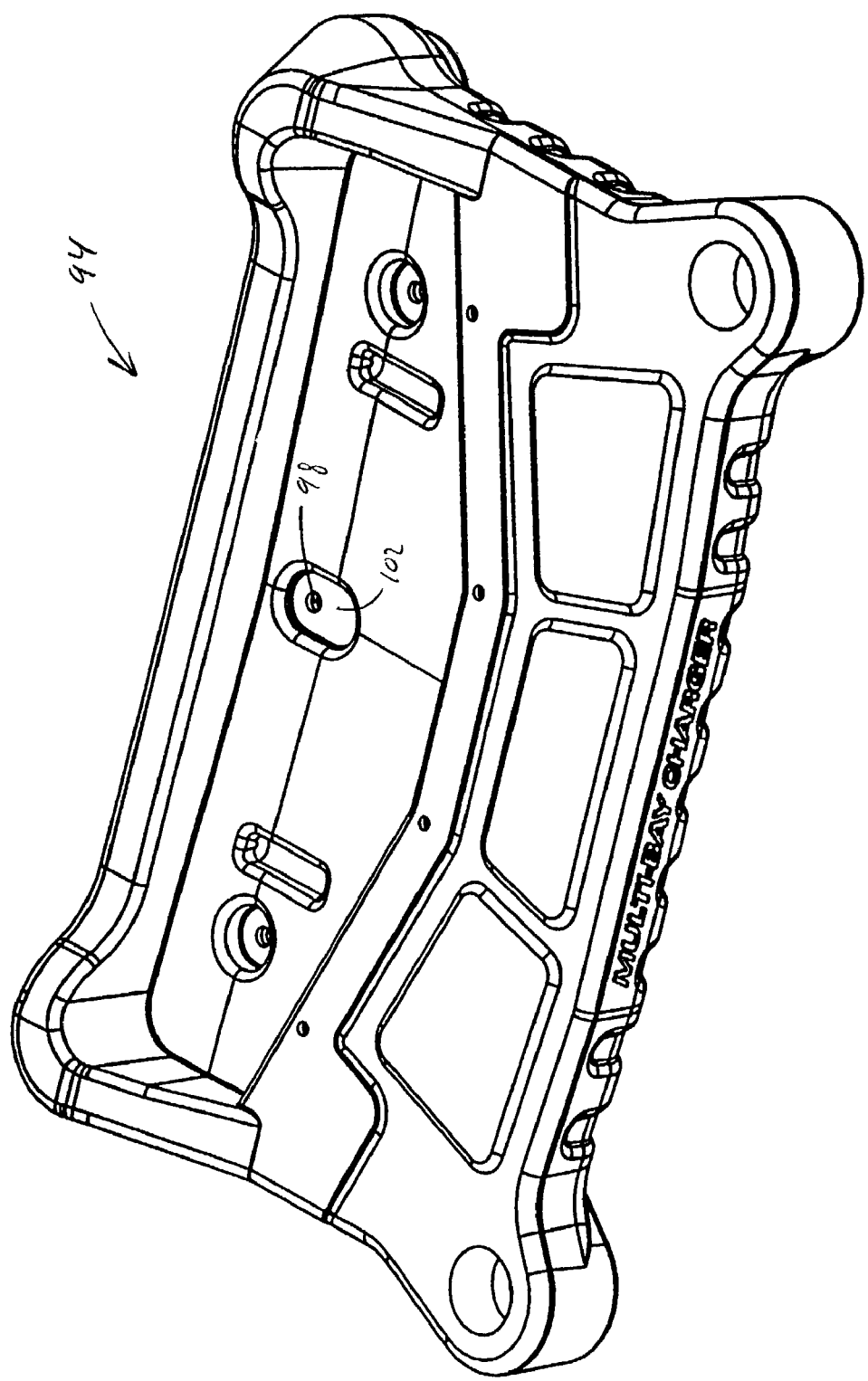
FIG. 8 is a top perspective view of the base separated from the battery charger shown in FIG. 1.
Figure 9:
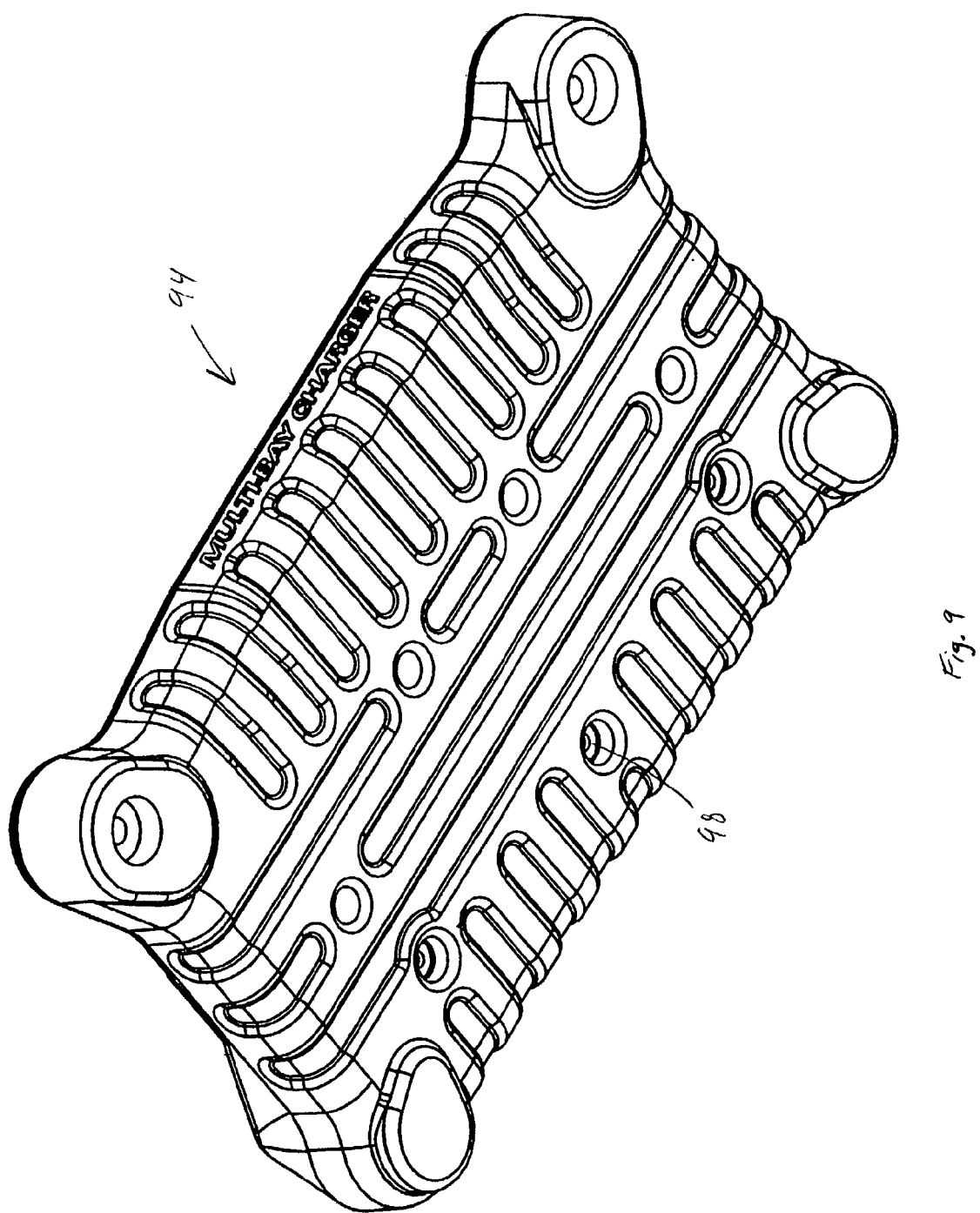
FIG. 9 is a bottom perspective view of the base shown in FIG. 8.

As shown in FIG. 8, the base 94 also includes a drain 98 positioned at a low spot 102 molded into the base 94. The drain 50 in the housing 18 and the drain 98 in the base 94 are in fluid communication but are offset from each other so that direct access to the cavity 30 through the drains 50, 98 is inhibited. As shown in FIG. 9, the drain 98 extends through the base 94 so that any contaminant that enters the battery charger 10 can be released.

Figure 13:
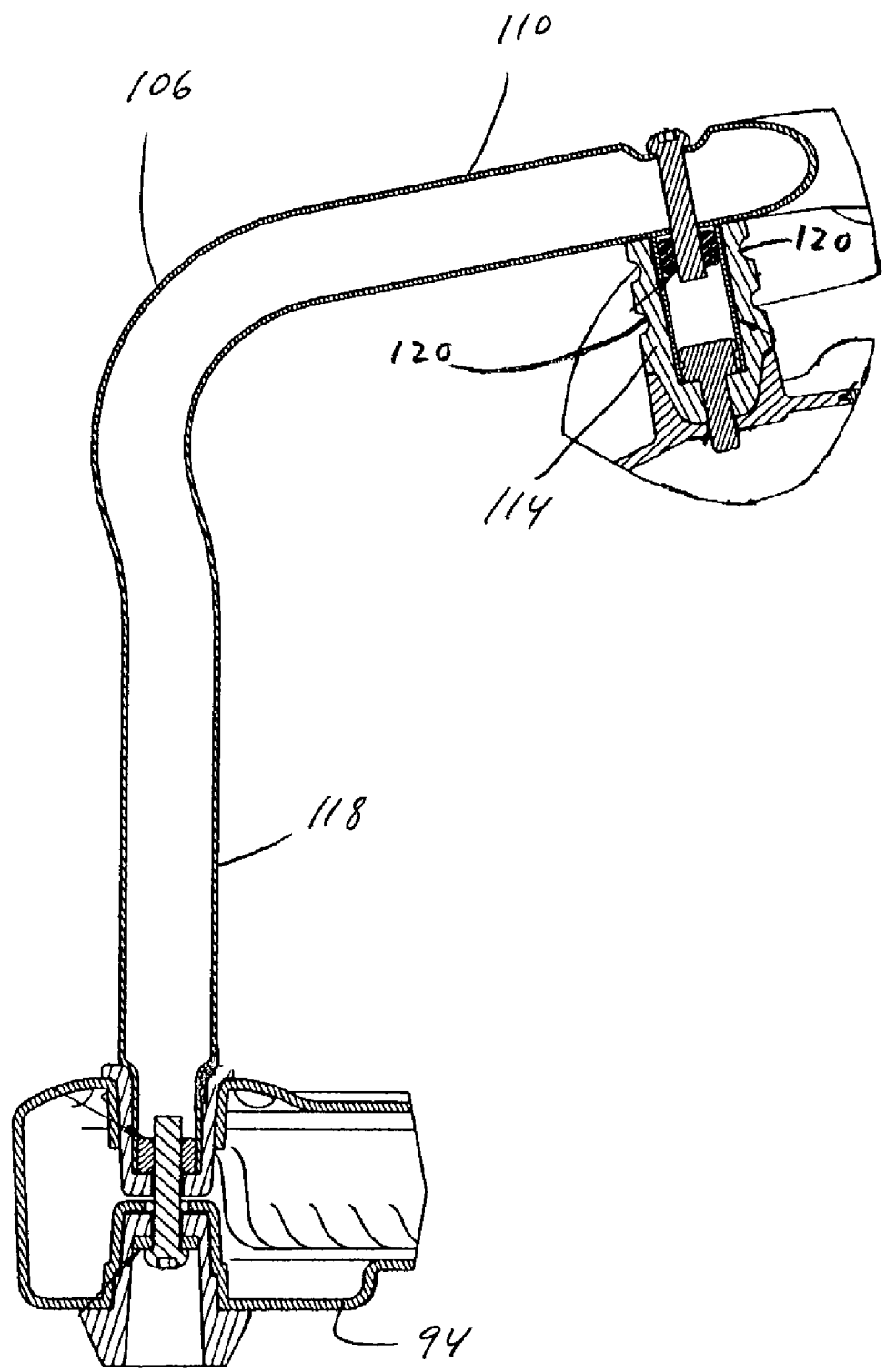
FIG. 13 is a cross-sectional view of a portion of the battery charger taken along lines 13-13 in FIG. 4.

As shown in FIGS. 1, 11 and 13, a handle 106 is connected to both the housing 18 and the base 94. The handle 106 is generally positioned towards the front of the charger 10 where the battery 14 attaches to the battery port 70. The handle 106 includes upper portions 110 connected to the housing 18 through impact-absorbing bumpers 114 and lower portions 118 connected to the base 94. The bumpers 114 are designed to both absorb and dampen impact energy. The bumpers 114 are made of an elastomeric material, such as polyurethane or natural rubber, with both spring and damping characteristics which allows this to happen. The bumpers 114 include channels 120 defined therein. The channels 120 extend around the perimeter of the bumpers 114, and allow the bumpers 114 to more easily compress upon being impacted. An ergonomic grip 122 is centrally positioned on the handle 106 to provide a comfortable, sure and steady grip on the handle 106. The grip 122 may include an elastic, non-slip material covering to provide comfort while the battery charger 10 is carried. In the illustrated construction, the handle 106 is made of two halves connected by the grip 122. However, in other constructions (not shown), the handle 106 may be made of a single component, such as, for example, a bar, having the grip 122 overmolded or integrally formed with the handle 106.

Figure 6:
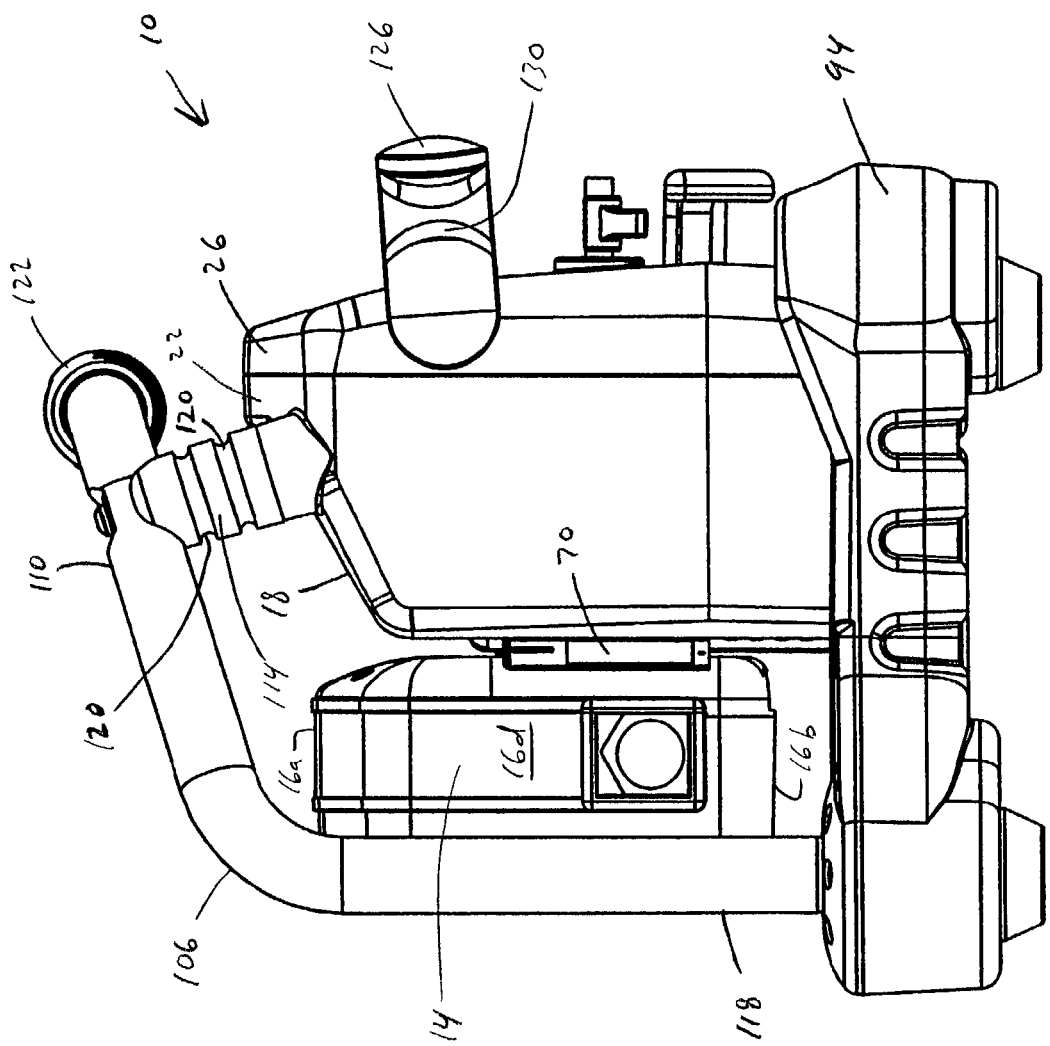
FIG. 6 is a right side view of the battery charger shown in FIG. 1.
Figure 7:
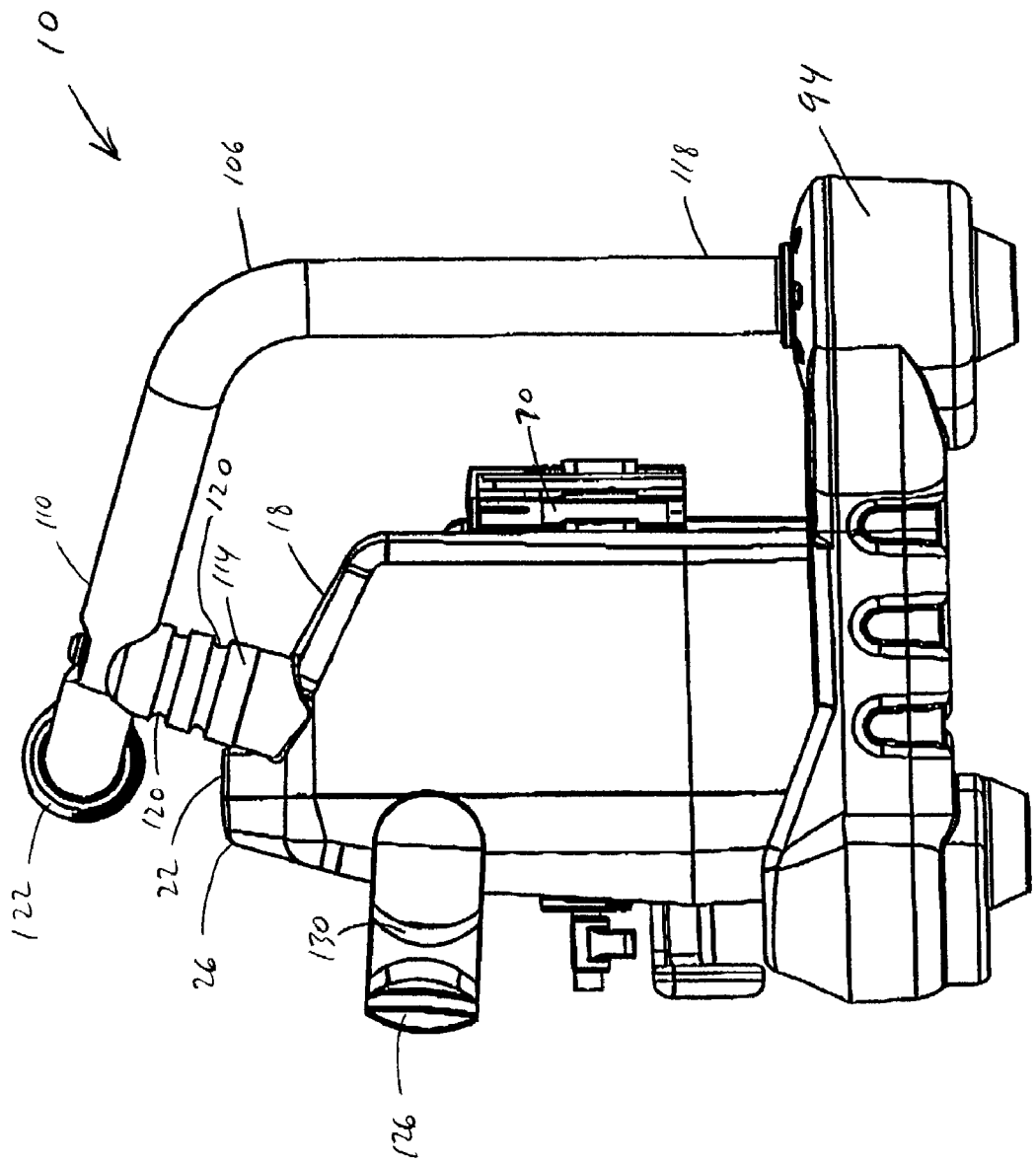
FIG. 7 is a left side view of the battery charger shown in FIG. 1 with the battery removed.

The handle 106 allows the user to carry the battery charger 10 to and from a work site, with or without batteries 14 connected to the battery charger 10. As shown in FIG. 6, an attached battery 14 is generally encompassed by a boundary defined by the base 94 and handle 106. As a result, the handle 106 also functions as a "roll bar," or protective structure. More particularly, the lower portions 118 of the handle 106 protect the front surface 16*c* of the battery 14 from being impacted by an object or surface wider than the distance between the lower portions 118 of the handle 106. Similarly, the lower portions 118 protect the side surfaces 16*d* from being impacted by an object or surface wider than the distance between the housing 18 and the lower portions 118. The base 94 protects the bottom surface 16*b* of the battery 14 from being impacted during a fall or other impacting event.

While the top surface 16*a* of the battery 14 is generally unimpeded to allow easy connection and removal of the battery 14, the upper portion 110 may provide some protection to the top surface 16*a* of the battery 14 from being impacted by an object or surface wider than the distance defined by the upper portion 110. In other constructions (not shown), an additional top cover (not shown) may be provided to protect the top surface 16a of the battery 14.

If the battery charger 10 were to fall or be impacted during movement around a work site, a combination of the base 94 and handle 106 would help prevent the battery 14 from jarring loose upon impact because the handle 106 or base 94 will be impacted first. Therefore, the handle 106 and the base 94 protects stored batteries 14 on the charger 10 from impacts.

In the illustrated construction, the bar-like handle 106 provides protective structure of the charger 10. In other constructions (not shown), the protective structure may include a solid wall that may extend from the outer surface of the housing 18 and surround surfaces of the batteries 14 to recess the batteries 14 into the wall, while allowing access to the batteries 14.

In yet other constructions (not shown), a cover or multiple covers may enclose or partially enclose the batteries 14 to protect them from impact. The cover or multiple covers may be removable/retractable manually or with insertion of the battery 14.

Figure 4:
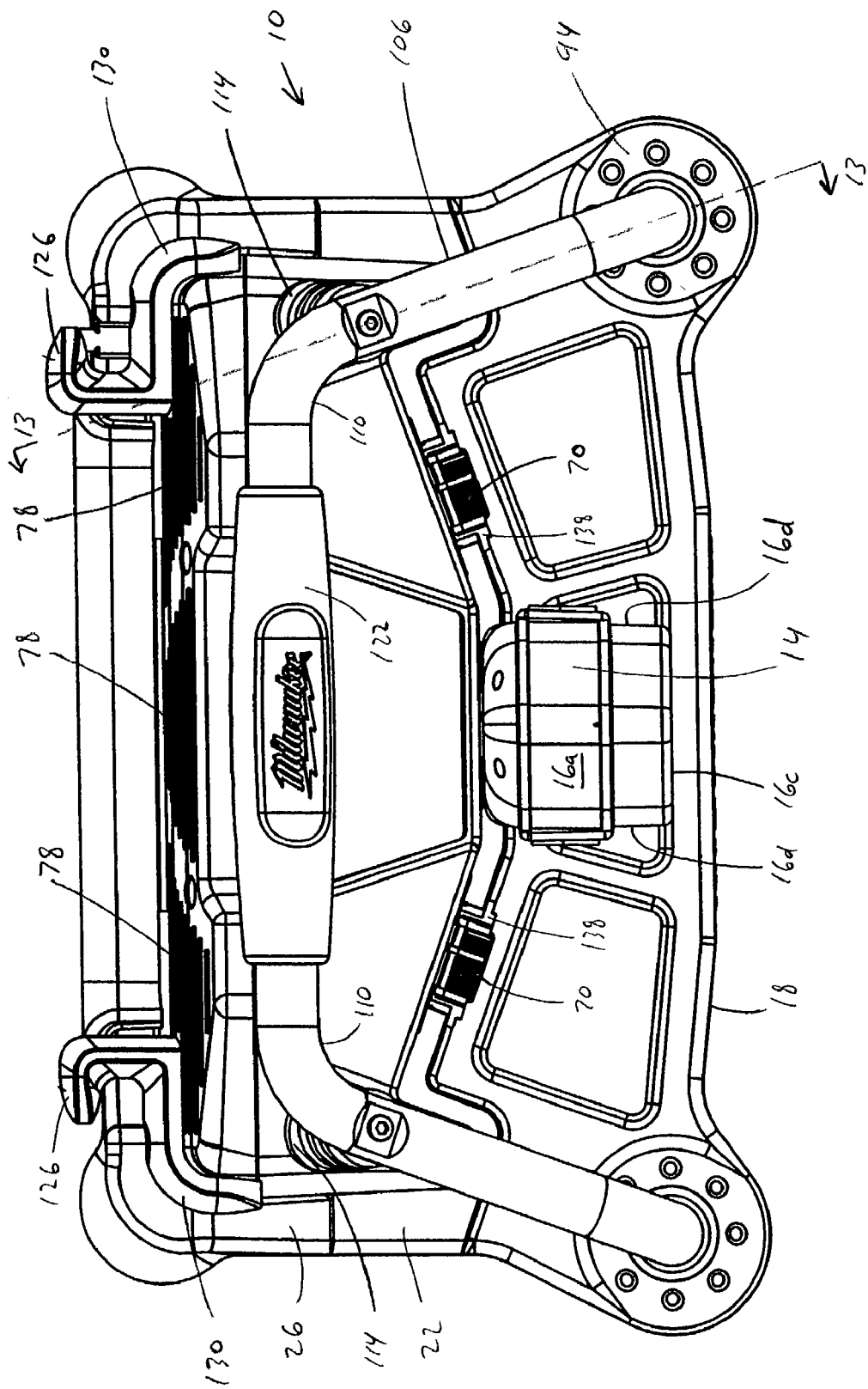
FIG. 4 is a top view of the battery charger shown in FIG. 1.
Figure 5:
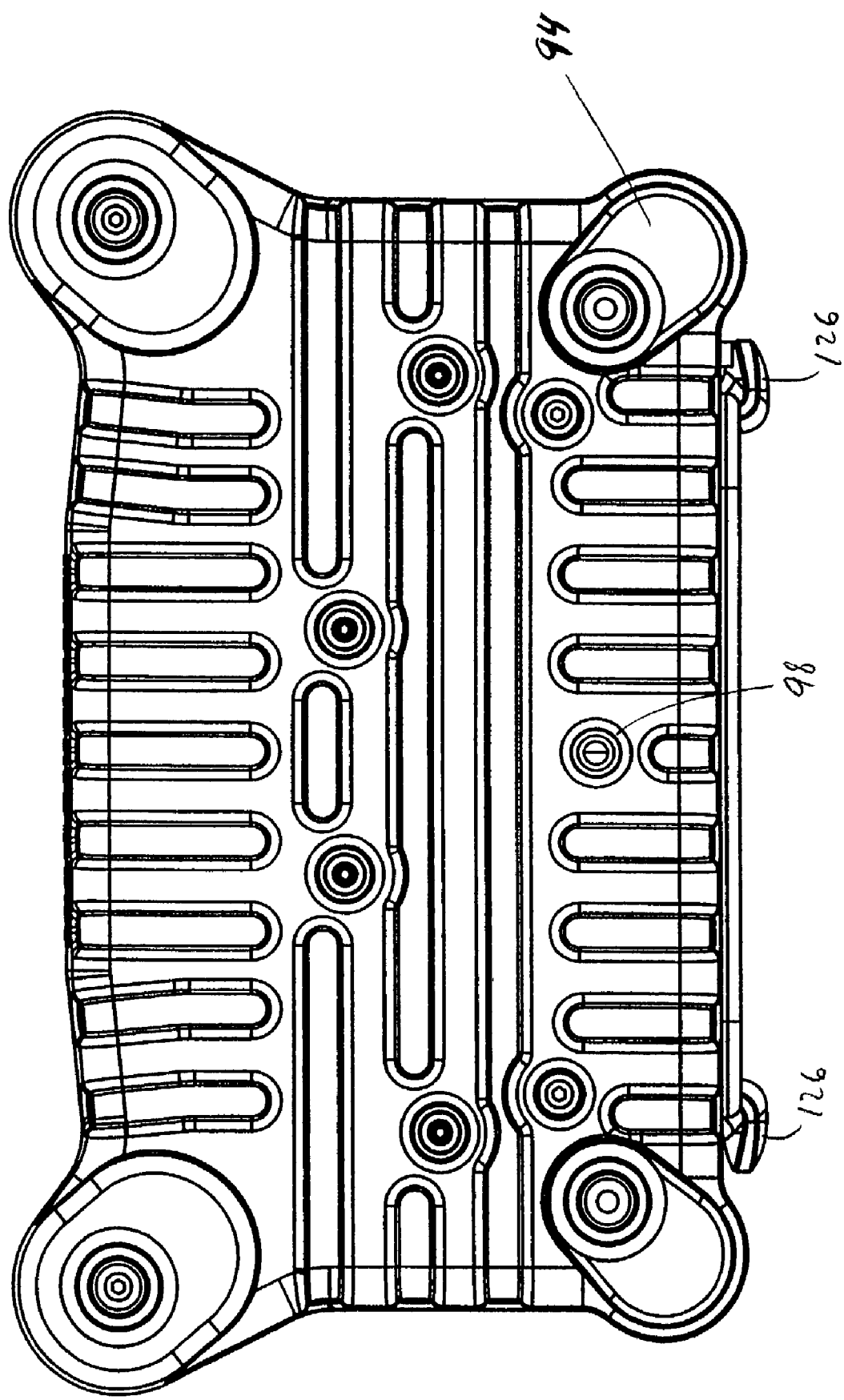
FIG. 5 is a bottom view of the battery charger shown in FIG. 1.

The bumpers 114 also absorb some of the energy upon impact, thereby decreasing the chance of jarring loose an attached battery 14 and decreasing the chance of breaking the charger 10 or components of the charger 10. As shown in FIG. 4, rear bumpers 126 and side bumpers 130 are also utilized to help protect the rear and sides of the housing 18, respectively. The rear and side bumpers 126, 130 are shown as a one-piece construction that is fastened to the housing 18. The rear and side bumpers 126, 130 are made of an impact-resistant and energy absorbing material, such as HDPE.

Figure 17:
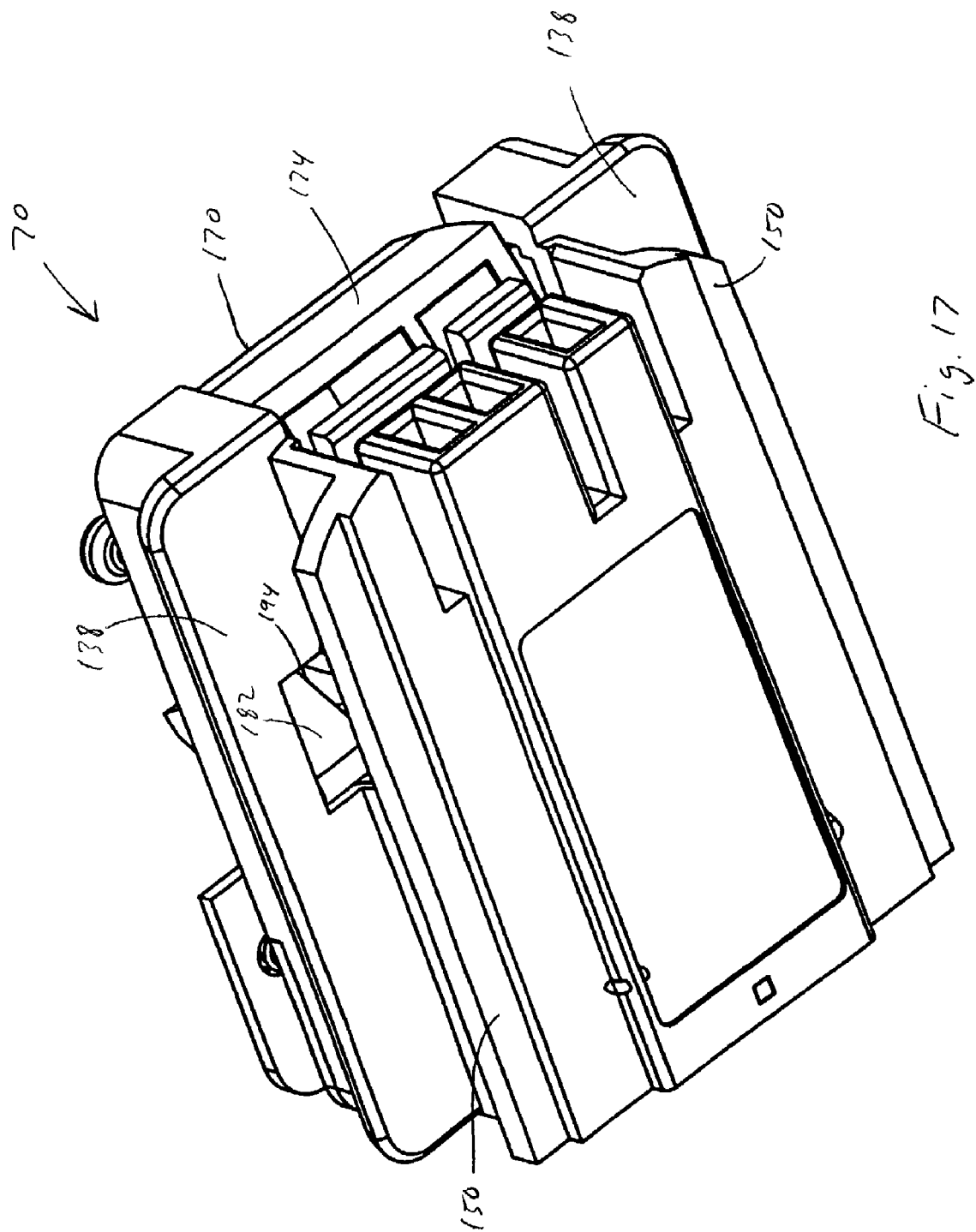
FIG. 17 is a front perspective view of the battery port.
Figure 18:
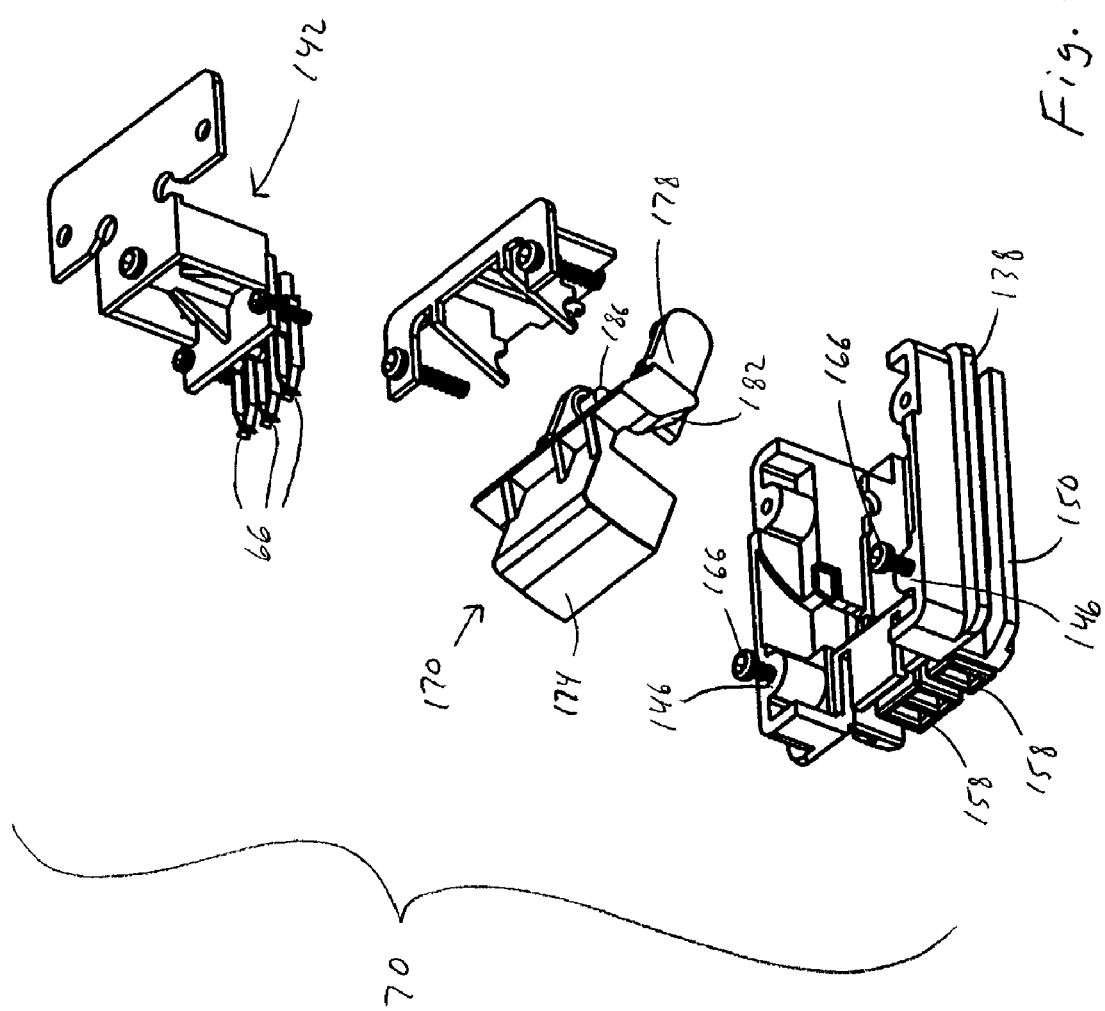
FIG. 18 is an exploded perspective view of the battery port of FIG. 17.
Figure 19:
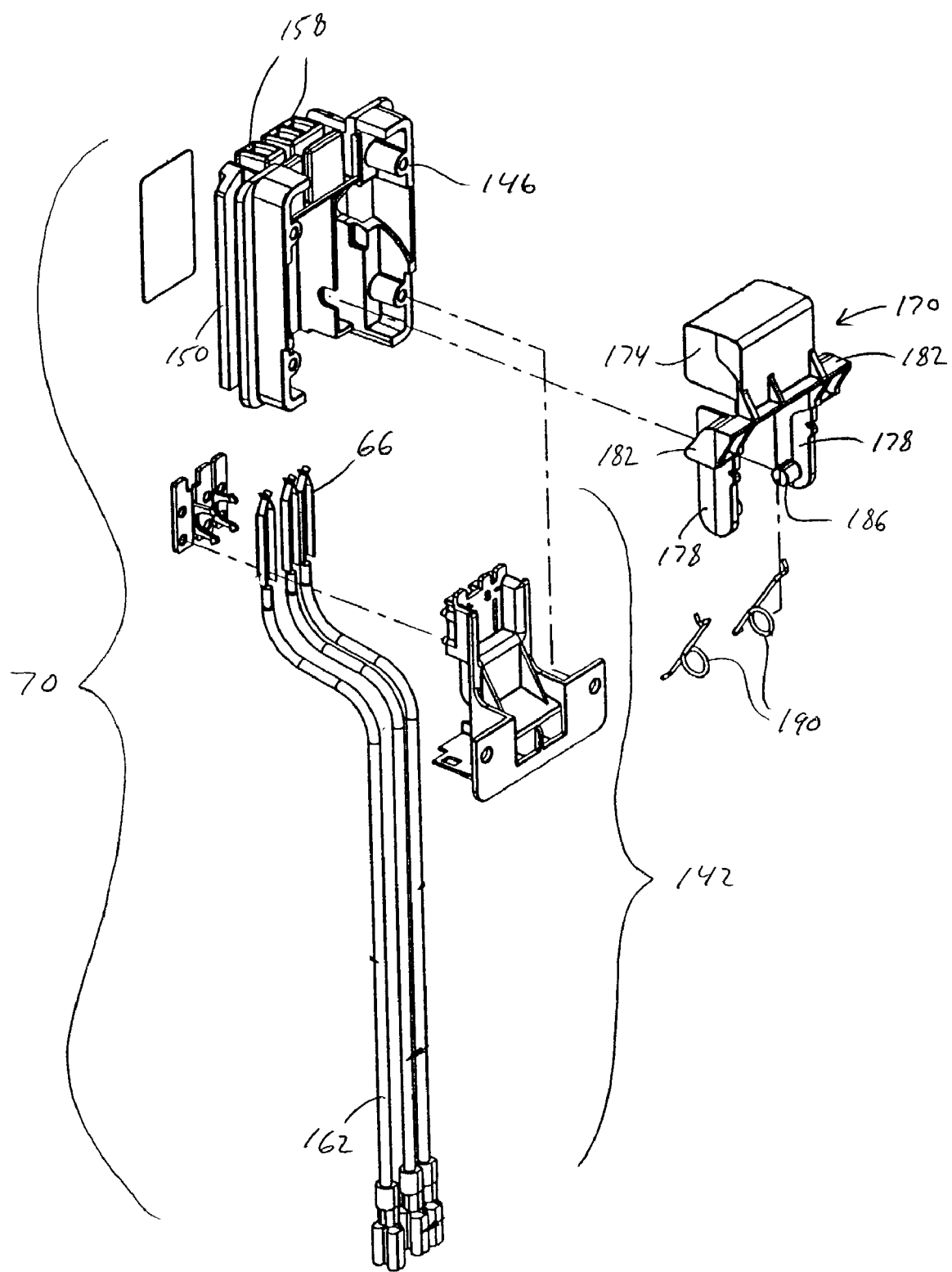
FIG. 19 is another exploded perspective view of the battery port of FIG. 17.
Figure 27:
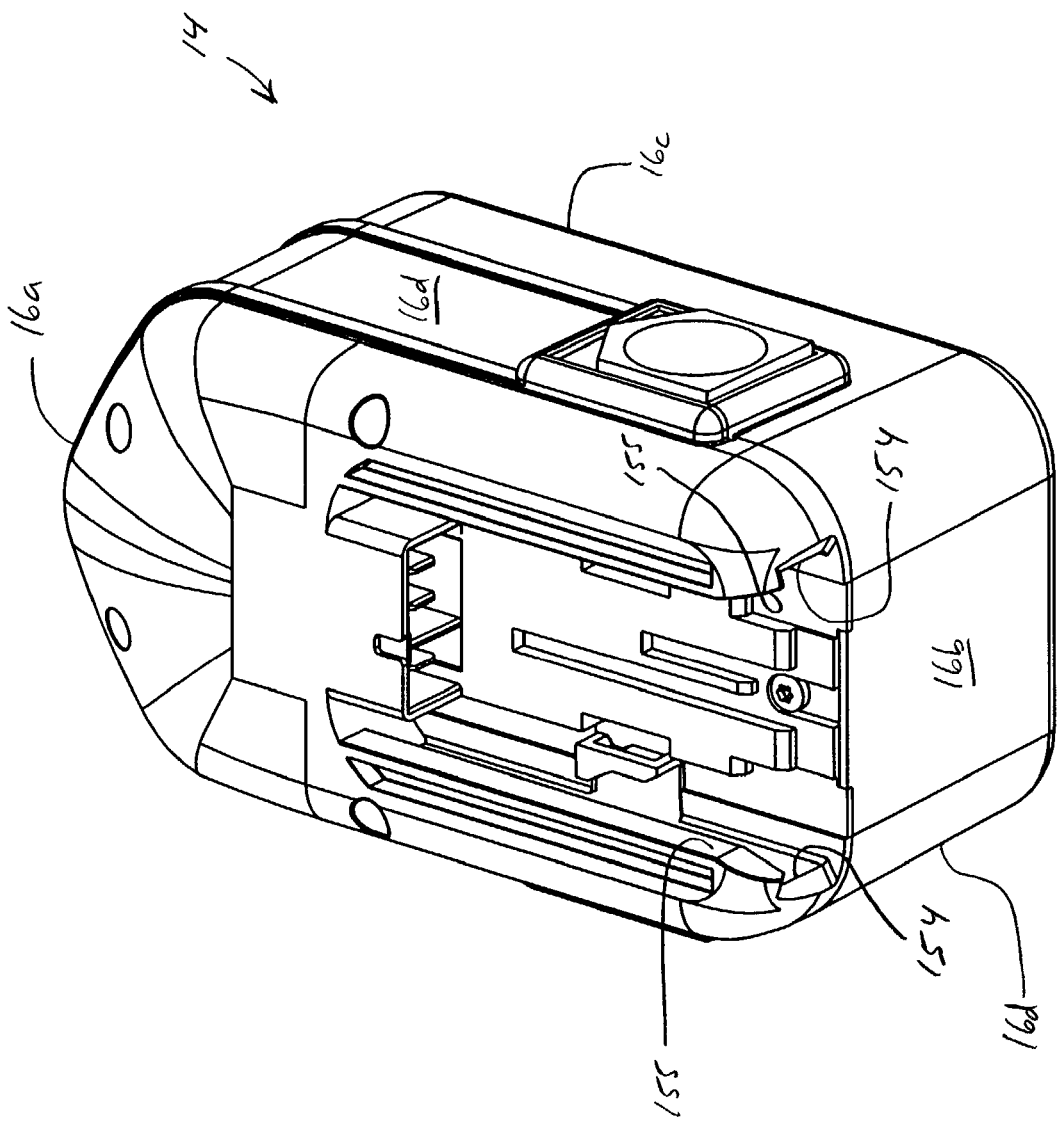
FIG. 27 is a top perspective view of the battery.

As shown in FIG. 11, openings are molded into the first shell 22 to accommodate multiple battery ports 70. In the illustrated construction, three battery ports 70 are provided by the battery charger 10. In other constructions (not shown) and in some aspects of the invention, the battery charger 10 may include fewer or more than three battery ports 70. As shown in FIG. 17, each battery port 70 includes a battery mounting portion 138, a terminal assembly 142, and a mounting portion 146. The battery mounting portion 138 includes battery port projections 150 to guide the battery 14 as the battery 14 engages with the port 70. The battery port projections 150 engage matching battery grooves 154 (shown in FIG. 27) on the battery 14 to provide positive alignment with and support on the port 70. Similarly, battery projections 155 engage matching battery port grooves 156 to provide positive alignment with and support on the port 70. As shown in FIGS. 14-16, a series of charger terminals 66 (part of the terminal assembly 142) are recessed within openings in the terminal supports 158 on the port 70. Electrical leads 162 connect the charging circuits 58 with the terminals 66 of a respective port 70. The mounting portion 146 further includes fasteners 166 that connect the port 70 with the housing 18.

The ports 70 are connected to the housing 18 in a sturdy manner such that if the charger 10 falls with the battery 14 attached, the associated port 70 will not break off the housing 18. The battery ports 70 are designed to survive a fall from about at least 4 feet with an attached battery 14 without breaking off the housing 18.

At least portions of the battery charger 10 through which power is transferred are formed of flame-retardant material, such as VØ rated plastic. These portions may include the charging circuits 58 and the mounting board 62 assembly and the battery ports 70. Because of this, other portions of the housing 18 may be formed of other materials.

In the illustrated construction, as explained in U.S. Pat. Nos. 6,222,343 and 6,456,035, the battery 14 supplies power to the charging circuit 58 to initiate charging. Even with the battery charger 10 connected to a power source, no power is provided at the terminals 66 if the battery 14 is not connected to the terminals 66. Therefore, if the battery 14 is not attached to a port 70, there is zero potential between the terminals 66 of that respective port 70. This helps ensure the charging circuit 58 cannot be shorted out when the battery 14 is not attached to the port 70 and reduces the risk of electrical shock when the battery 14 is not attached.

Figure 20:
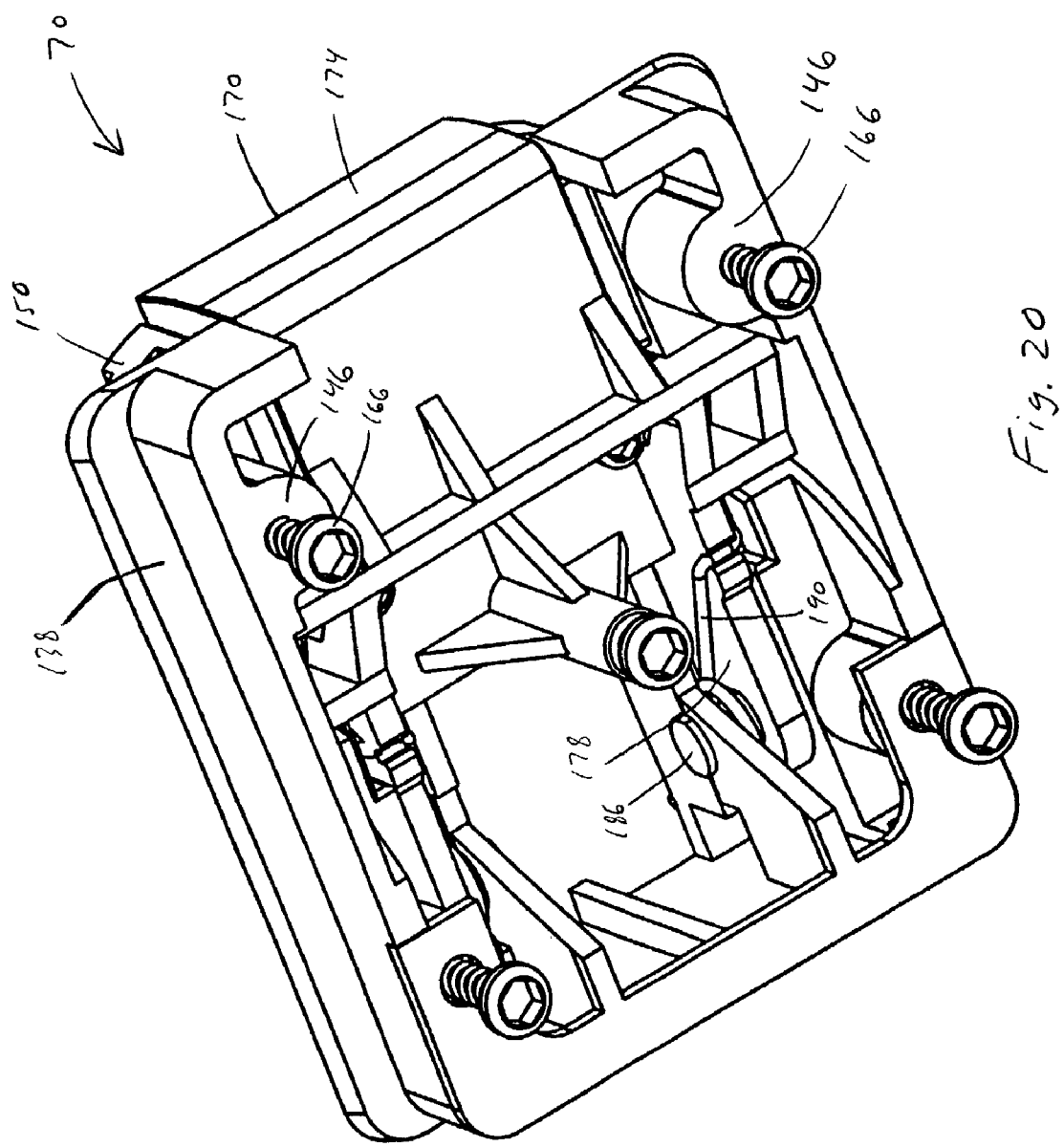
FIG. 20 is a rear perspective view of the battery port shown in FIG. 17 and showing mounting hardware and components involved with mounting the port to the housing.
Figure 21:
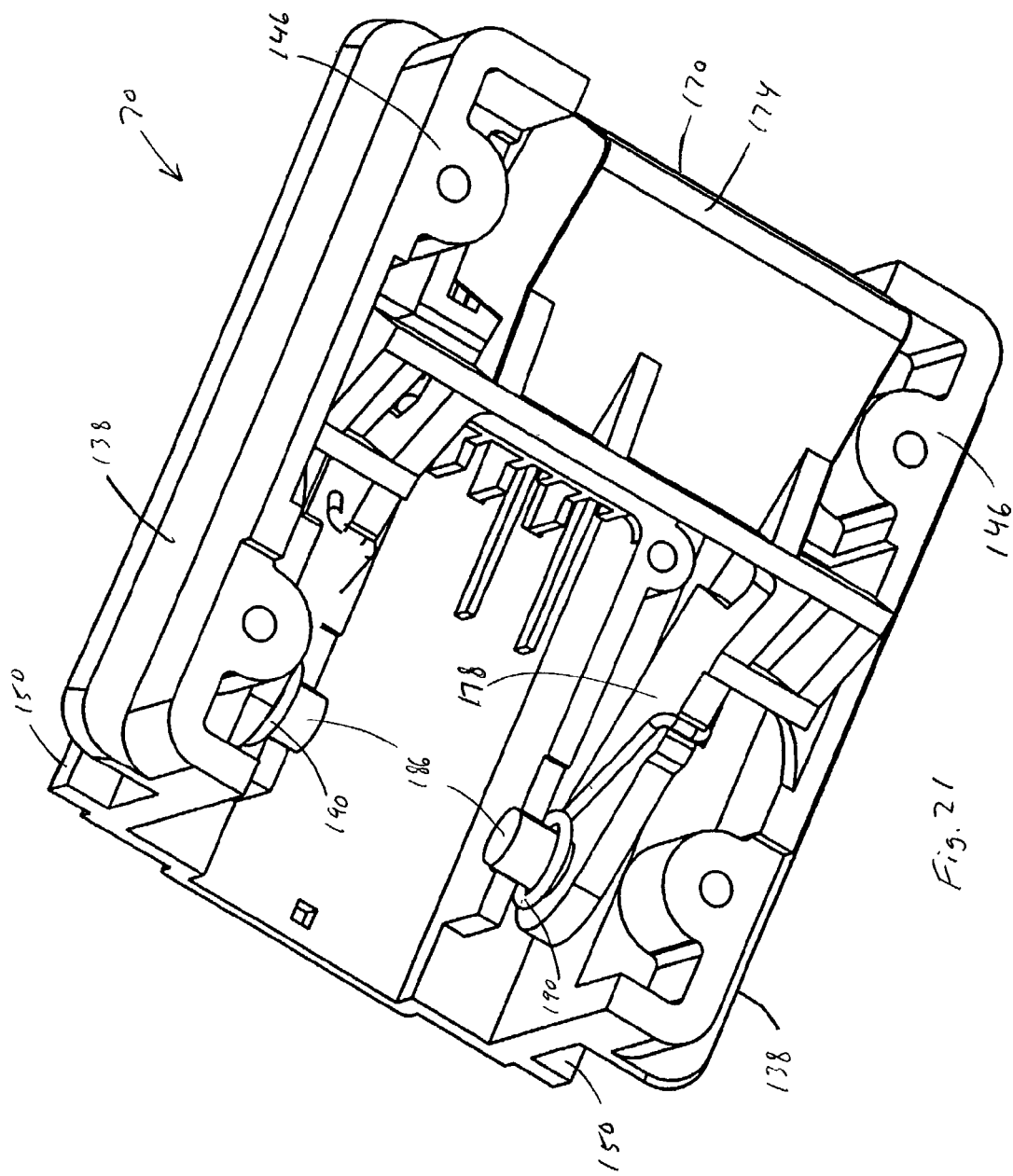
FIG. 21 is a rear perspective view similar to that of FIG. 20 with portions removed and showing the pivoting structure of the terminal cover.
Figure 22:
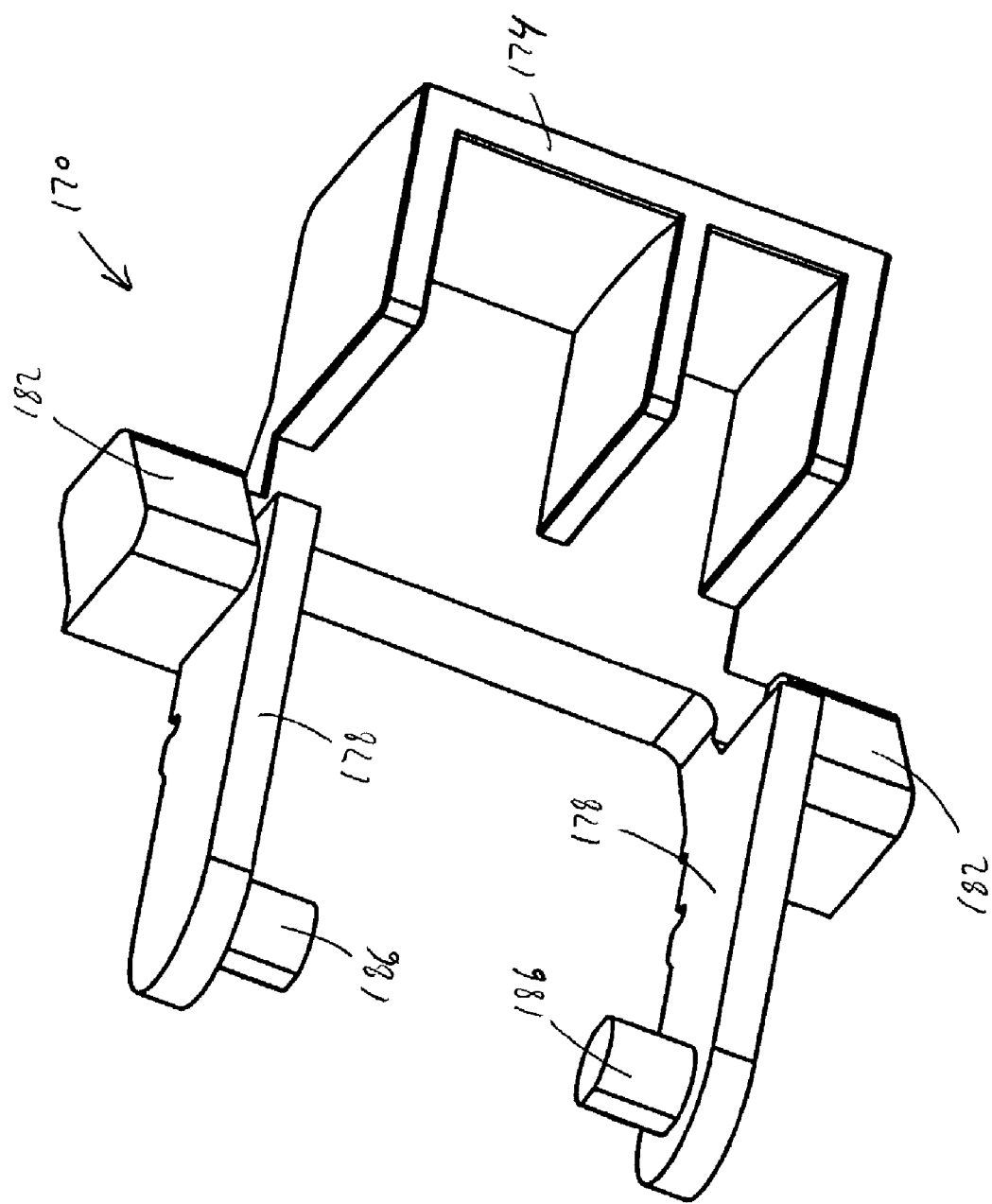
FIG. 22 is a front perspective view of the terminal cover removed from the battery port.
Figure 23:
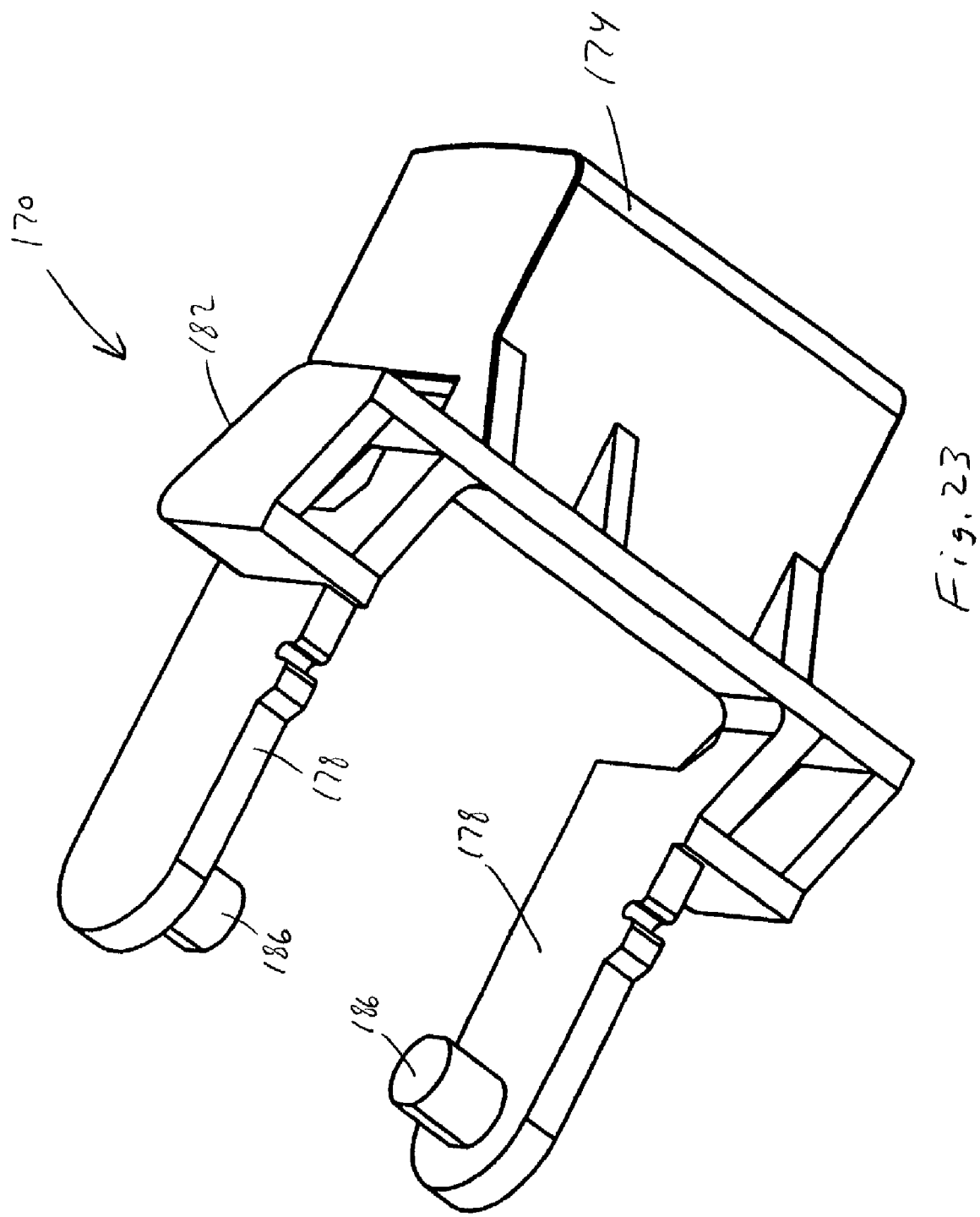
FIG. 23 is a rear perspective view of the terminal cover shown in FIG. 22.
Figure 24:
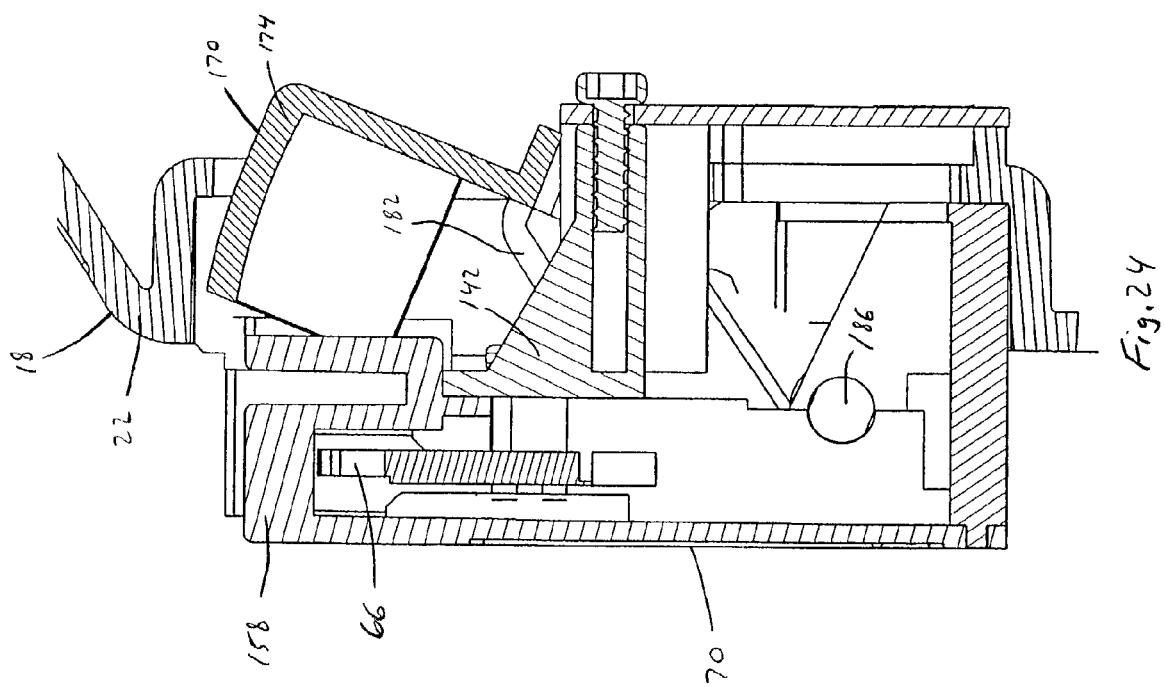
FIG. 24 is an enlarged view of a portion of the battery charger shown in FIG. 10.
Figure 25:
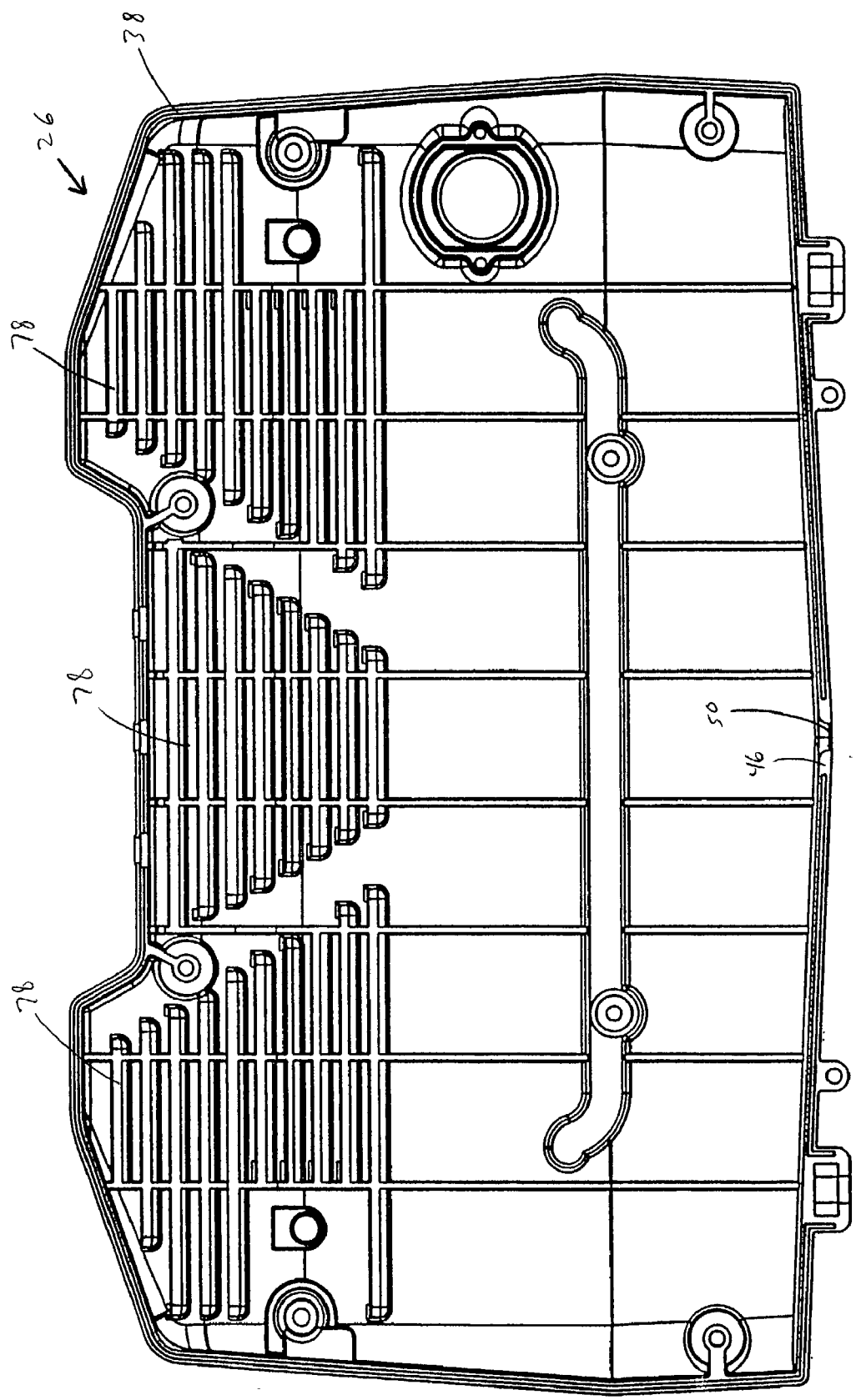
FIG. 25 is a front view of an interior portion of the rear shell of the housing.
Figure 26:
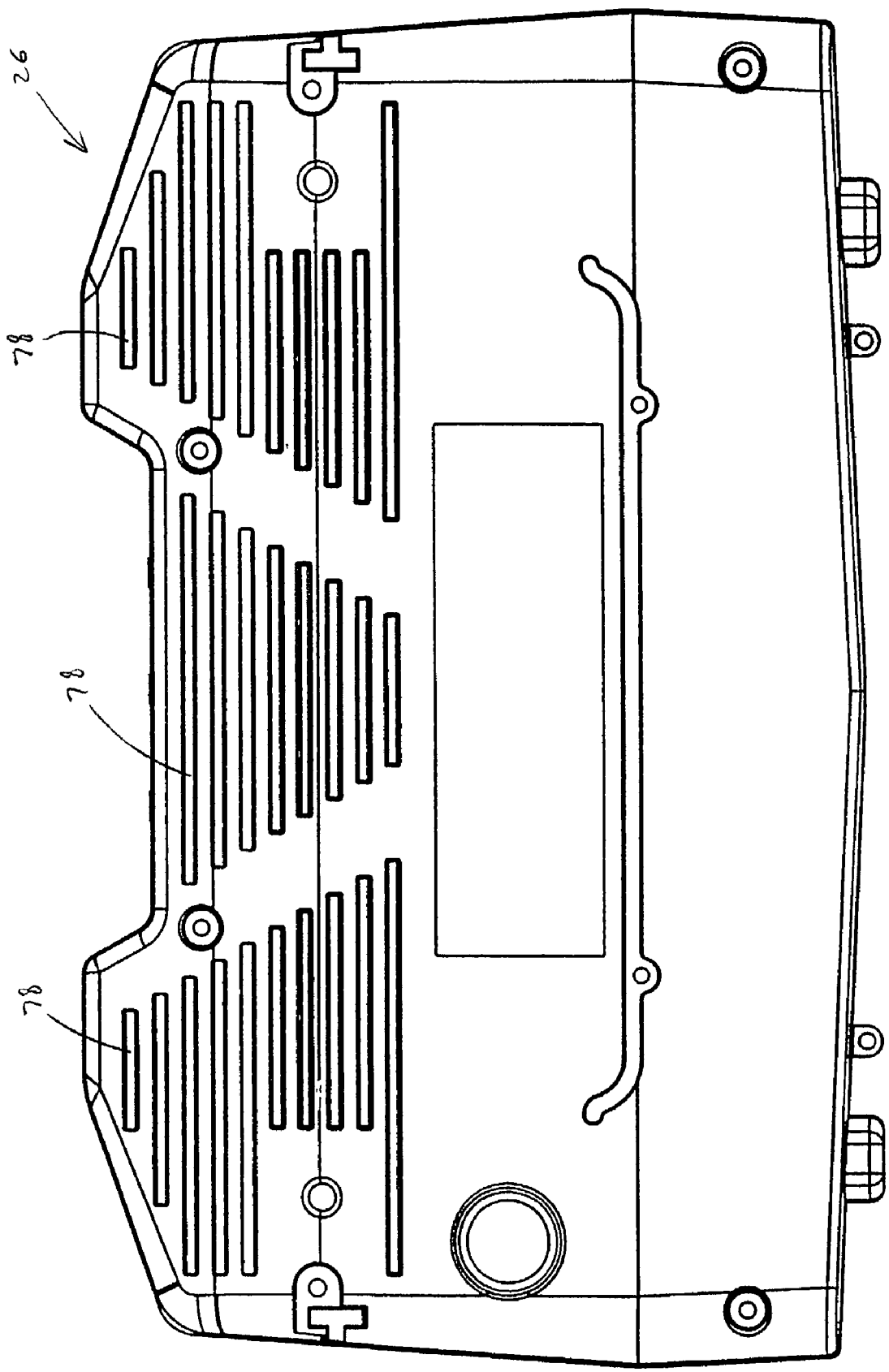
FIG. 26 is a rear view of an exterior portion of the rear shell shown in FIG. 25.

As shown in FIGS. 17-21, each battery port 70 also includes a terminal cover 170 that is, in the illustrated construction, spring-biased to cover the terminal support 158. As shown in FIGS. 22 and 23, the terminal cover 170 includes a hood 174 having a mounting stem 178 on each side. A ramp 182 is positioned on each stem 178 between the hood 174 and a pivot 186, at which the cover 170 is attached to the port 70. FIGS. 15 and 20-21 illustrate the cover 170 assembled with the port 70. Biasing members, such as, in the illustrated construction, torsion springs 190, are positioned between the port 70 and the mounting stems 178 to bias the hood 174 to a covered position over the openings in the terminal supports 158.

In the illustrated construction, the action of sliding the battery 14 onto the battery mounting portion 138 causes the terminal cover 170 to pivotally retract to uncover the openings in the terminal supports 158 and expose the terminals 66 to the battery 14. Specifically, the battery mounting portion 138 includes an opening 194 through which the ramps 182 project. The battery projections 155 engage the ramps 182 upon engaging the battery mounting portion 138. The ramps 182 include a slope sufficient to cause the terminal cover 170 to pivot against the biasing force of the springs 190, thereby exposing the terminal supports 158 and the terminals 66 to the battery 14. When the battery 14 is removed, the springs 190 force the cover 170 to pivot back over the terminal supports 158. The biasing force is sufficient to close the cover 170 without preventing attachment of the battery 14.

As shown in FIG. 10, the terminal cover 170 retracts into the cavity 30 when actuated by battery 14 insertion. The cover 170 moves along a path to sweep away contaminants and to clear the interconnection between the port 70 and the battery 14. The terminal cover 170 also helps minimize the terminals 66 exposure to the outside environment. When closed, the cover 170 deflects contaminants (i.e. dirt, dust, sand, water, oil, grease, etc.) from adhering to the terminals 66 and adversely affecting the electrical connection between the charging circuit 58 and the battery 14.

In alternate constructions (not shown) and in some aspects of the invention, the terminal cover 170 may move in a different manner, such as linearly sliding away from the terminal supports 158, rather than pivoting away from the terminal supports 158 upon the battery 14 engaging the battery mounting portion 138. Also, the terminal cover 170 may be operable by the user, such as by depressing a button to retract the terminal cover 170.

Figure 28:
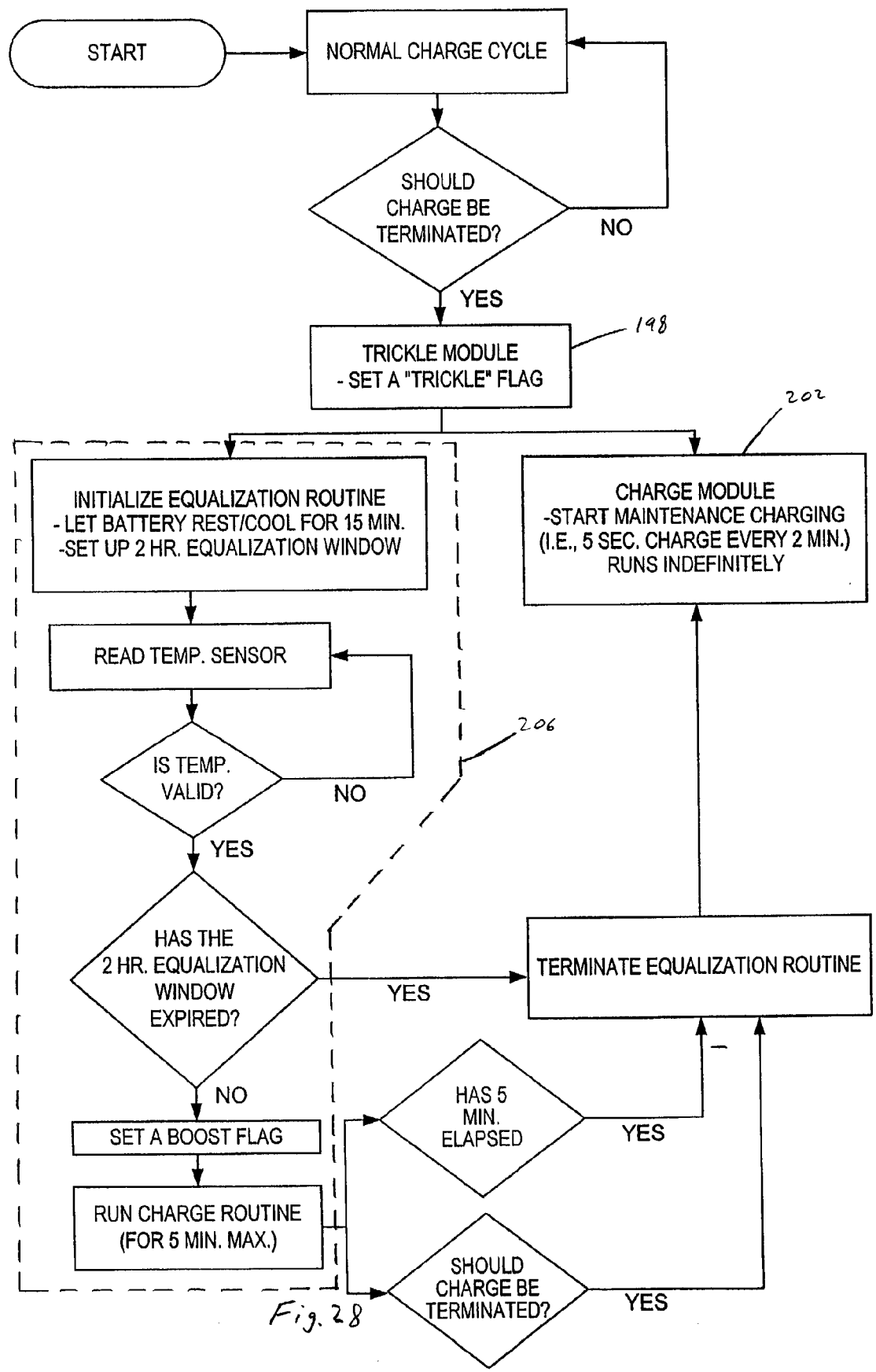
FIG. 28 is a flow chart illustrating a software functional description of the acts involved with charge execution.

As shown in FIG. 28, a plurality of charge termination protocols, including a temperature rate ("TR") termination protocol, and firmware modules, including a trickle module 198, a charge module 202, and an equalization module 206, provide control of battery charging.

The TR charge termination protocol monitors the rate of temperature increase of a battery 14 during a charging cycle and terminates the charge flow when the battery 14 reaches a predetermined rate temperature change. The TR protocol also accounts for thermal lagging which causes the battery 14 to continue heating after removal of the charging current. The TR protocol provides a reduction in battery charge time, a control of heat increase due to charging, and an increase in battery life.

The firmware executes code that monitors the normal charge cycle of a battery 14. The charge cycle may be terminated by the TR termination protocol as previously described. Termination of the normal charge cycle results in execution of code pertaining to the trickle module 198. The trickle module 198 is operable to set a "trickle" flag in software that corresponds to termination of the normal charge cycle and initiation of the trickle module 198. Setting the trickle flag initiates the charge module 202 and the equalization module 206. The charge module 202 is operable to impose a maintenance charge on the battery 14 whereby a current pulse is applied to the battery 14 for approximately five seconds every two minutes.

The equalization module 206 executes code that allows the battery 14 to rest and cool for approximately fifteen minutes and sets a time limit for the equalization to occur. If the equalization module 206 does not execute within the time limit, the module terminates and the charge module 202 continues the maintenance charge. While within the time limit, a sensor monitors the temperature of the battery 14. If the temperature is in an acceptable range, a "boost" flag is set in software. Setting the boost flag initiates a boost charge cycle, for which the maximum duration is set by a boost timer. The boost timer is typically 5 minutes, however, other values are possible depending on the type and capacity of the battery 14. Either the boost timer or one of the charge termination protocols, such as the TR protocol, is operable to terminate the boost charge cycle. If the boost timer expires before a charge a termination protocol executes, the equalization module 206 terminates and the charge module 202 continues the maintenance charge.

The equalization module 206 executes once per charging cycle and serves to charge the battery toward 100% of rated charge capacity. The TR termination protocol controls the charging current level during execution of the equalization module 206. The rate of heating is typically lower than seen during the normal battery charge cycle. Supplying a charge flow at a reduced heating rate increases the charge of the battery 14 toward maximum capacity while minimizing the heating stress imposed on the battery 14 by the charger.

For example, with Nickel metal-Hydride ("NiMH") batteries, a NiMH battery is charged at a normal current level (about 3.0 amps) using the TR termination protocol. The expected temperature at the point of charge termination should be about 40 degrees Celsius, or about 15 degrees above the ambient air temperature. Due to thermal lagging, the NiMH battery may continue to heat for between about 15-30 minutes after charge termination, where an additional 5-7 degree Celsius rise is usually experienced.

The equalization routine 206 includes the following operating steps upon TR charge termination. If the battery is left in the charger, the battery will eventually cool. After cooling, the battery is between about 90-95% charge capacity. When the battery has cooled below 30 degrees Celsius, the equalization routine 206 executes code that initiates further charging at a specific charge rate, such as, for example, a rate that provides a one degree Celsius battery temperature increase per minute. Using this routine 206, the NiMH battery is capable of accepting the remaining 5-10% of charge capacity.

Figure 29:
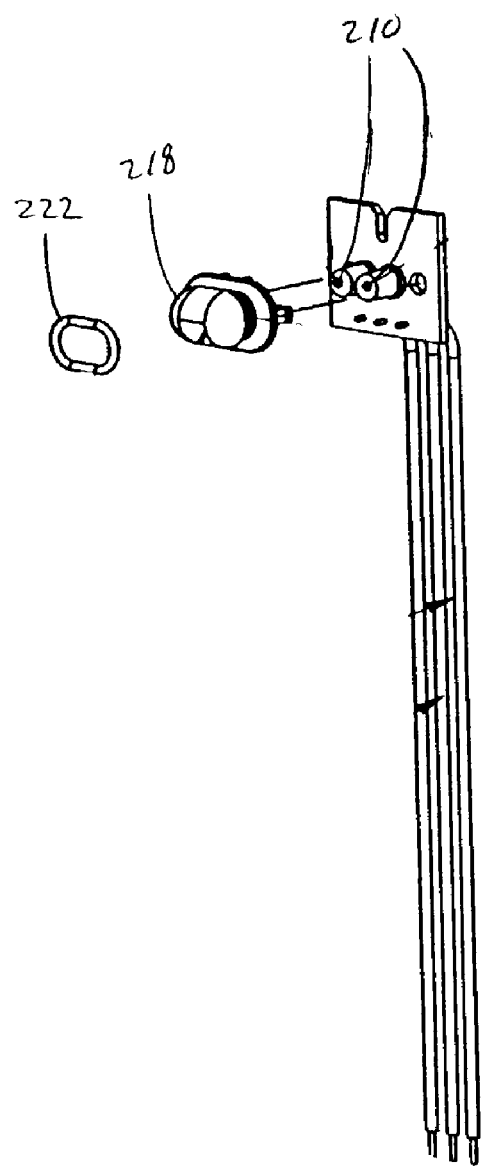
FIG. 29 is an exploded perspective view of an LED charge status indicator assembly.
Figure 31:
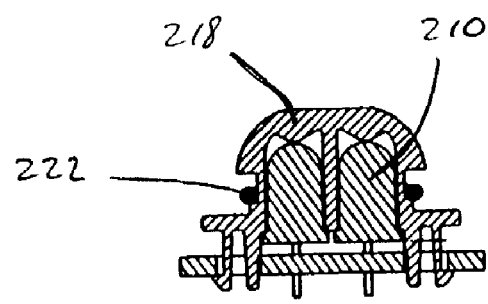
FIG. 31 is a cross-sectional view of the LED charge status indicator assembly taken along lines 31-31 of FIG. 10.
Figure 30:
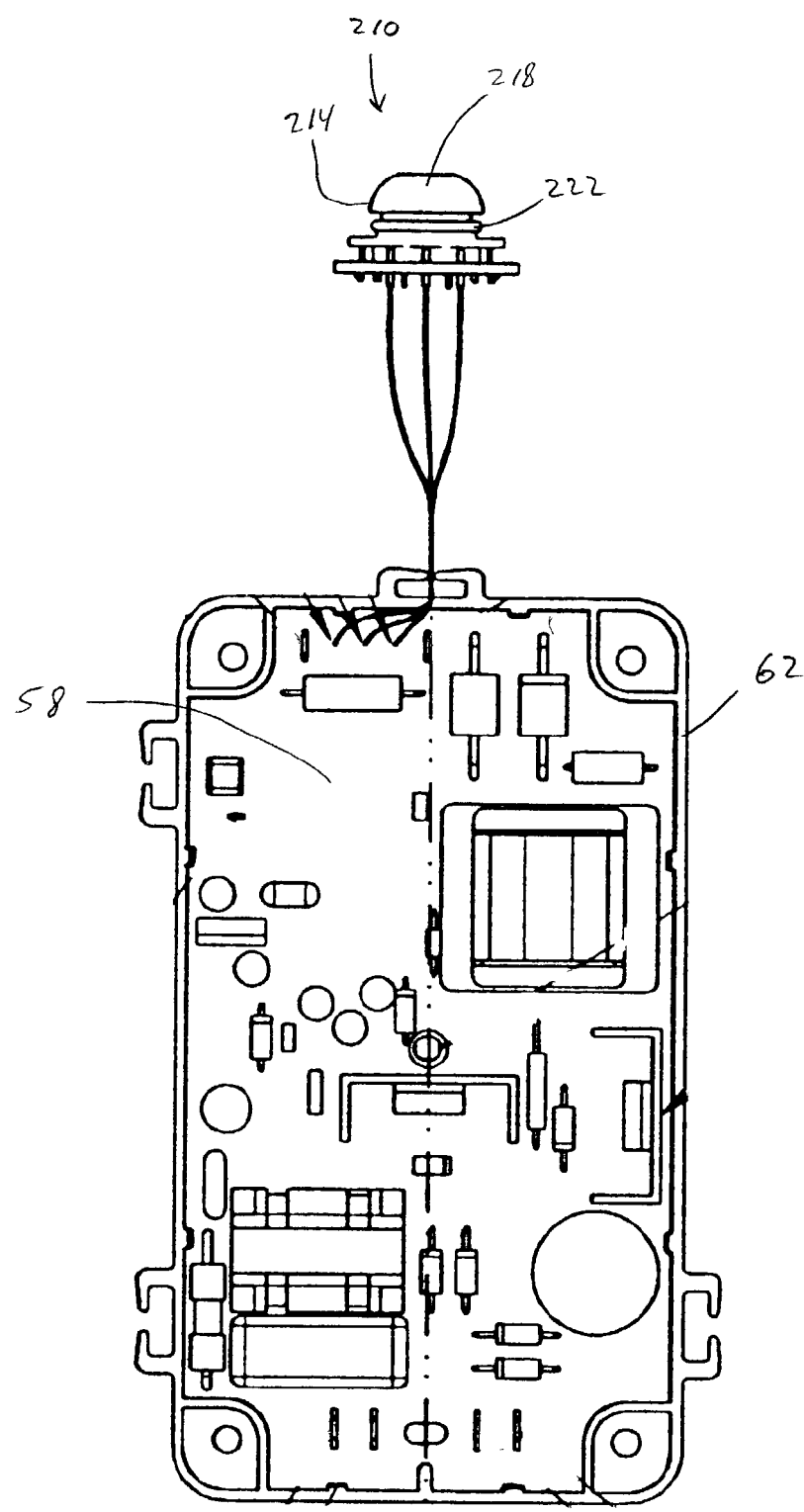
FIG. 30 is a rear view of a mounting board including a charging circuit and showing the LED charge status indicator electrically connecting with the charging circuit.

As shown in FIGS. 29-31, charge status indicators, including light-emitting diodes ("LED") 210, are electrically connected with each charging circuit 58 to relay the charging status of each battery 14 to the user. The LEDs 210 are designed to emit an amount of light necessary to overcome the intensity of outdoor sunlight. The LEDs 210 are positioned outside of the housing 18 so that the outer perimeter 214 is generally viewable from any direction relative to the housing. For example, if the charger 10 was positioned on a surface at eye level (in which the top side of the charger 10 is not viewable), the outer perimeters 214 of the LEDs 210 are still viewable because the LEDs 210 project from the top side of the housing. Each LED 210 also includes an LED cover 218 that encloses the portion of the LED 210 that projects from the housing 18. The covers 218, in addition to protecting the LEDs 210, also diffuse the light emitted by the LEDs 210 to increase the viewable distance and viewable angle of the LEDs 210. A gasket 222 is positioned between the cover 218 and the housing 18 to help prevent contamination from entering the housing 18 through the openings in the housing 18 for the LEDs 210.

In other constructions, the LEDs 210 may be positioned on any viewable surface of the housing 18, rather than the top surface of the housing 18. In other constructions (not shown), other visual indicators such as, for example, a potentiometer-based needle or a liquid crystal display window to provide digital charge status information, may be provided.

In other constructions (not shown) and in some aspects of the invention, the charger 10 may utilize an audio indicator rather than a visual indicator to relay battery charge status to the user. Such audio indicators may include electronic bells, chimes, a pre-recorded voice message, etc.

It should be understood that some aspects of the invention may be incorporated into other types of electrical equipment, such as, for example, electric power tools, audio components, etc. For example, the heavy-duty construction may be incorporated into audio components and other relatively-less durable electronic equipment for use in harsh working environments. Also, suspended, cushioned and/or sealed electrical circuits may be incorporated into audio components and such equipment. In addition, independent features of the invention such as, for example, contaminant-resistant air vents, contaminant drains, movable electrical terminal covers, and/or protruding LEDs may be incorporated into electrical equipment such as, for example, electric power tools, generators, audio equipment, communication equipment, etc.

One or more independent features and independent advantages are set forth in the claims.

We claim:

1. A battery charger comprising:
a housing;
a charging circuit supported by the housing and electrically connectable to a power source and to a battery;
a vent defined by the housing, the vent releasing heated air from the housing and impeding entry of contaminants into the housing, the vent causing the heated air to turn downwardly through the vent before being released from the housing; and
a drain defined by the housing, the drain releasing contaminants from the housing;
wherein the vent includes
a first protrusion extending into the housing, and
a second protrusion extending into the housing;
wherein a vent passageway is defined between the first and second protrusions, and wherein at least one of the first protrusion and the second protrusion has a stepped shape including a center portion, an outer lip portion extending downwardly from the center portion and an inner lip portion extending upwardly from the center portion.

2. The battery charger as set forth in claim 1, wherein the vent is a first vent, and wherein the battery charger further comprises a second vent defined by the housing at a lower elevation relative to the first vent, the second vent allowing unheated air to enter the housing.

3. The battery charger as set forth in claim 2, wherein the first vent and the second vent are positioned relative to the charging circuit to convect air around the charging circuit.

* * * * *